United States Patent
Dinan

(10) Patent No.: US 12,245,167 B2
(45) Date of Patent: *Mar. 4, 2025

(54) TYPE 2 POWER HEADROOM OF A PRIMARY CELL

(71) Applicant: Peninsula Technologies, LLC, Allen, TX (US)

(72) Inventor: Esmael Hejazi Dinan, McLean, VA (US)

(73) Assignee: Peninsula Technologies, LLC, Allen, TX (US)

(*) Notice: Subject to any disclaimer, the term of this patent is extended or adjusted under 35 U.S.C. 154(b) by 48 days.

This patent is subject to a terminal disclaimer.

(21) Appl. No.: 18/112,761

(22) Filed: Feb. 22, 2023

(65) Prior Publication Data
US 2023/0199673 A1 Jun. 22, 2023

Related U.S. Application Data

(63) Continuation of application No. 16/570,282, filed on Sep. 13, 2019, now Pat. No. 12,004,090, which is a
(Continued)

(51) Int. Cl.
*H04W 52/36* (2009.01)
*H04W 52/14* (2009.01)

(52) U.S. Cl.
CPC ....... *H04W 52/365* (2013.01); *H04W 52/146* (2013.01)

(58) Field of Classification Search
CPC . H04W 52/365; H04W 52/325; H04W 52/14; H04W 52/143; H04W 52/42; H04W 52/242; H04W 52/34; H04W 52/16; H04W 72/20; H04W 72/21; H04W 72/23; H04W 72/231; H04W 72/232; H04W 72/0446;
(Continued)

(56) References Cited

U.S. PATENT DOCUMENTS

| 8,855,061 B2 | 10/2014 | Heo et al. |
| 10,051,500 B2 | 8/2018 | Kim et al. |

(Continued)

FOREIGN PATENT DOCUMENTS

| WO | 2014/186932 A1 | 11/2014 |
| WO | 2015/018348 A1 | 2/2015 |

(Continued)

OTHER PUBLICATIONS

3GPP TR 36.889 V1.0.1 (Jun. 2015); Technical Report; 3rd Generation Partnership Project; Technical Specification Group Radio Access Network; Study on Licensed-Assisted Access to Unlicensed Spectrum; (Release 13).
(Continued)

*Primary Examiner* — Peter Chen
(74) *Attorney, Agent, or Firm* — Ascenda Law Group, PC

(57) ABSTRACT

A base station transmits, to a wireless device, at least one message comprising configuration parameters of a plurality of cells. The plurality of cells comprise a primary cell and one or more secondary cells. The base station receives, from the wireless device, a power headroom report (PHR). The PHR comprises a Type 2 power headroom of the primary cell in response to a licensed assisted access cell, of the one or more secondary cells, having an uplink that is configured and activated.

20 Claims, 15 Drawing Sheets

Related U.S. Application Data continuation-in-part of application No. 15/606,932, filed on May 26, 2017, now Pat. No. 10,420,040.

(60) Provisional application No. 62/341,732, filed on May 26, 2016.

(58) Field of Classification Search
CPC ..... H04L 5/0053; H04L 5/0055; H04L 5/001; H04L 5/0091; H04L 5/0094; H04L 5/0048; H04L 5/0051
See application file for complete search history.

(56) References Cited

U.S. PATENT DOCUMENTS

| | | | |
|---|---|---|---|
| 2013/0250890 | A1 | 9/2013 | Kim et al. |
| 2016/0212737 | A1 | 7/2016 | Jang et al. |
| 2016/0262118 | A1 | 9/2016 | Kim et al. |
| 2016/0309425 | A1 | 10/2016 | Yi et al. |
| 2017/0135090 | A1 | 5/2017 | Yin et al. |
| 2017/0290014 | A1 | 10/2017 | Kim et al. |

FOREIGN PATENT DOCUMENTS

| | | | |
|---|---|---|---|
| WO | 2015/093746 | A1 | 6/2015 |
| WO | 2015/093768 | A1 | 6/2015 |
| WO | 2015/152589 | A1 | 10/2015 |
| WO | 2015/174759 | A1 | 11/2015 |
| WO | 2016/072704 | A1 | 5/2016 |

OTHER PUBLICATIONS

3GPP TS 36.213 V13.0.1 (Jan. 2016); Release 13; pp. 7-318.

3GPP TS 36.300 V13.2.0 (Dec. 2015); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 13).

3GPP TS 36.331 V13.0.0 (Dec. 2015); Technical Specification; 3rd Generation Partnership Project; Technical Specification Group Radio Access Network; Evolved Universal Terrestrial Radio Access (E-UTRA); Radio Resource Control (RRC); Protocol specification; (Release 13).

R2-164013; 3GPP TSG-RAN WG2 Meeting #94; Nanjing, P.R. China, May 23-27, 2016; CR-Form-v11.1; Change Request; 36.321 CR 0874; rev—; Current version: 13.1.0; Title: Running MAC CR for LAA.

International Search Report and Written Opinion of the International Searching authority mailed Jul. 21, 2017, in International Application No. PCT/US2017/034777.

R1-155722; 3GPP TSG RAN WG1 #82bis; Oct. 5-9, 2015; Malmo, Sweden; Agenda item:7.2.3.1; Source: Qualcomm Incorporated; Title: Remaining details of UL LBT operation; Document for: Discussion and Decision.

R1-162330; 3GPP TSG RAN WG1 Meeting #84bis; Busan, Korea, Apr. 11-15, 2016; Source: ZTE Microelectronics Technology, Nubia Technology; Title: TPC and PHR for UL LAA; Agenda Item: 7.3.1.5; Document for: Discussion and Decision.

R1-162662; 3GPP TSG RAN WG1 Meeting #84bis; Busan, Korea Apr. 11-15, 2016; Agenda item: 7.3.1.1; Source: Samsung; Title: Discussion on UL power control for UL LAA; Document for: Discussion.

R2-152243; 3GPP TSG-RAN WG2 Meeting #90; Fukuoka, Japan, May 25-29, 2015; Source: Samsung; Title: UL LAA support and UL Scheduling in MAC; Agenda item: 7.1.3; Document for: Discussion and Agreement.

R2-162429; 3GPP TSG-RAN WG2 Meeting #93bis; Dubrovnik, Croatia Apr. 11-15, 2016; Agenda item: 8.1.1; Source: Huawei, HiSilicon; Title: Considerations on Qos control and UL transmission on LAA SCell; Document for: Discussion and Decision.

R2-162894; 3GPP TSG-RAN WG2 Meeting #93bis; Dubrovnik, Croatia, Apr. 11-15, 2016; Agenda Item: 8.1.1 (LTE_eLAA-Core); Source: LG Electronics Inc.; Title: PHR aspect for supporting UL LAA; Document for: Discussion.

R2-163663; 3GPP TSG-RAN WG2 Meeting #94; Nanjing, China, May 23-27, 2016; Agenda item: 8.1.3; Source: Samsung; Title: UL scheduling for eLAA; Document for: Discussion and Agreement.

R2-163665; 3GPP TSG-RAN WG2 Meeting #94; Nanjing, China, May 23-27, 2016; Agenda item: 8.1.3; Source: Samsung; Title: PHR details for eLAA; Document for: Discussion and Agreement.

R2-164053; 3GPP TSG-RAN WG2 Meeting #94; Nanjing, China, May 23-27, 2016; Agenda item: 8.1.3; Source: Nokia, Alcatel-Lucent Shanghai Bell; Title: Bearer and MAC CE mapping for eLAA; WID/SID: LTE_eLAA-Core—Release 14; Document for: Discussion and Decision.

R2-164054; 3GPP TSG-RAN WG2 Meeting #94; Nanjing, China, May 23-27, 2016; Agenda item: 8.1.3; Source: Nokia, Alcatel-Lucent Shanghai Bell; Title: PHR for eLAA; WID/SID: LTE_eLAA-Core—Release 14; Document for: Discussion and Decision.

R2-164219; 3GPP TSG-RAN WG2 Meeting #94; Nanjing, China, May 23-27, 2016; Agenda Item: 8.1.3 (LTE_eLAA-Core); Source: LG Electronics Inc.; Title: PHR aspect for supporting UL LAA; Document for: Discussion.

R2-164258, 3GPP TSG-RAN WG2 Meeting #94; Nanjing, China May 23-27, 2016; CR-Form-v11.1; Change Request; 36.331 CR 2225; rev; Current version: 13.1.0; Title: Introduction of enhanced LAA for LTE.

R2-165502; 3GPP TSG-RAN WG2 Meeting #95; Gothenburg, Sweden Aug. 22-26, 2016; Agenda item: 8.1.3; Source: Huawei, HiSilicon; Title: Considerations on Type 2 PH; Document for: Discussion and Decision.

R2-166793; 3GPP TSG-RAN WG2 Meeting #95bis; Kaohsiung, Taiwan, Oct. 10-14, 2016; Agenda item: 8.1.2; Source: Nokia, Alcatel-Lucent Shanghai Bell, HiSilicon, Huawei, Samsung; Title: Type 2 PH with LAA SCells; WID/SID: LTE_eLAA-Core—Release 14; Document for: Discussion and Decision.

Indian Office Action, mailed Sep. 30, 2020, in Indian Patent Application No. 201817045641.

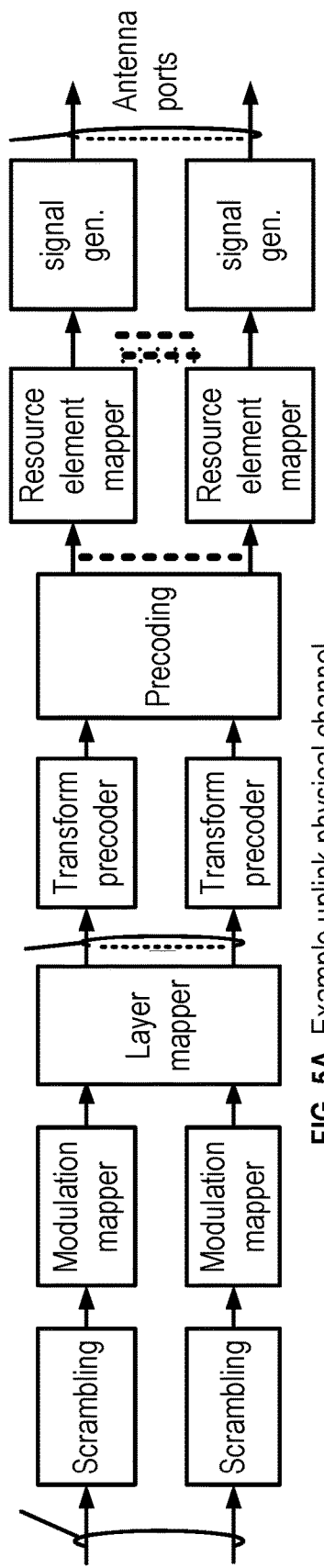
FIG. 5A Example uplink physical channel
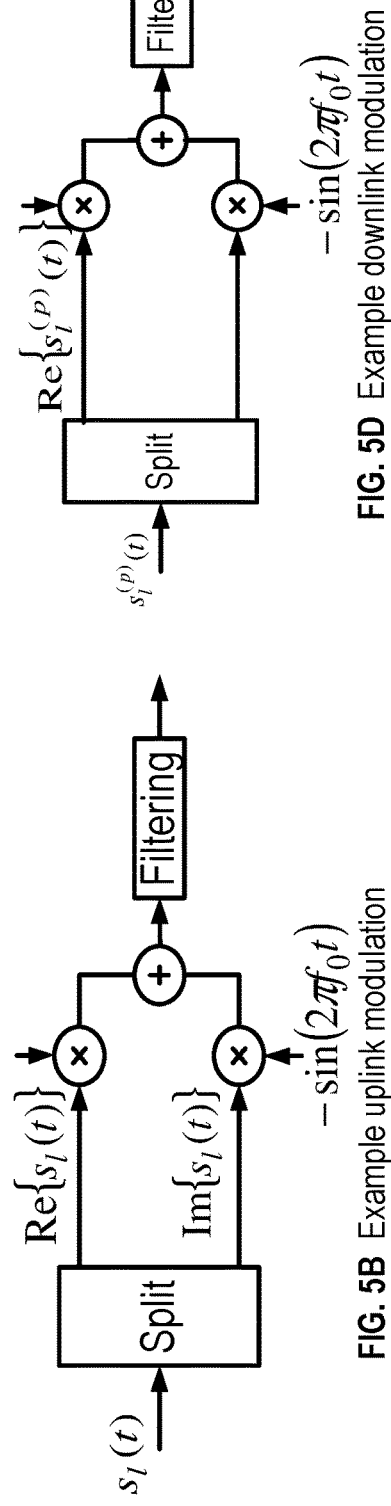
FIG. 5B Example uplink modulation
FIG. 5D Example downlink modulation
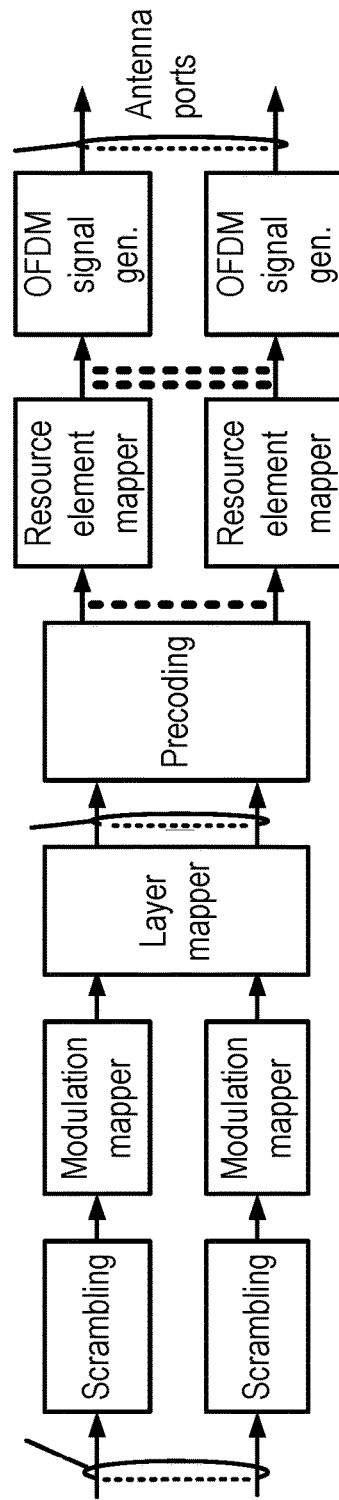
FIG. 5C Example downlink physical channel Dual-Connectivity at eNB

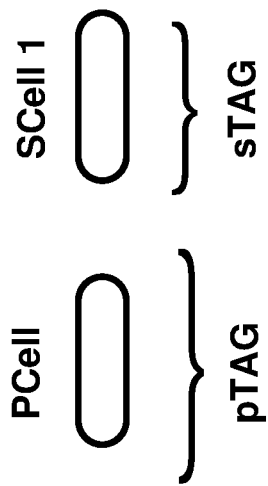
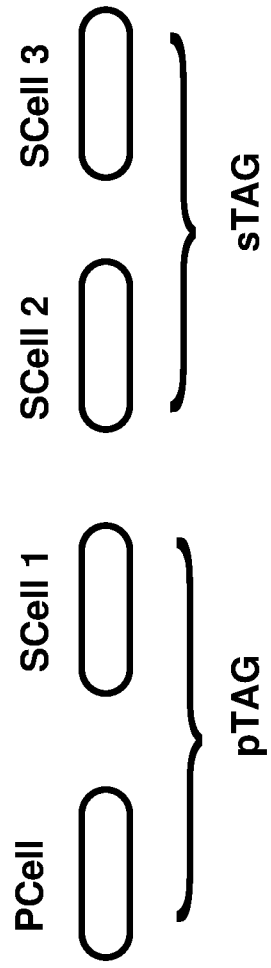
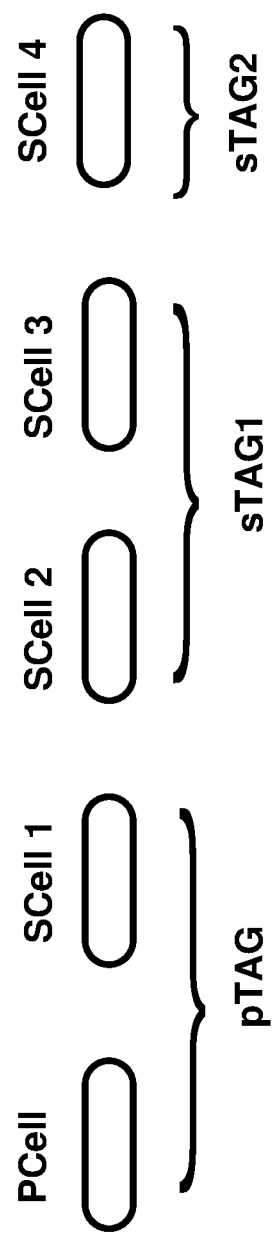
FIG. 8

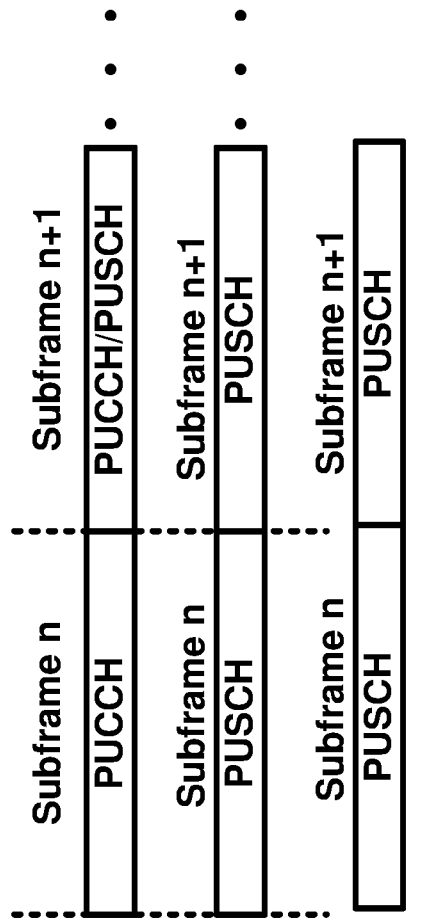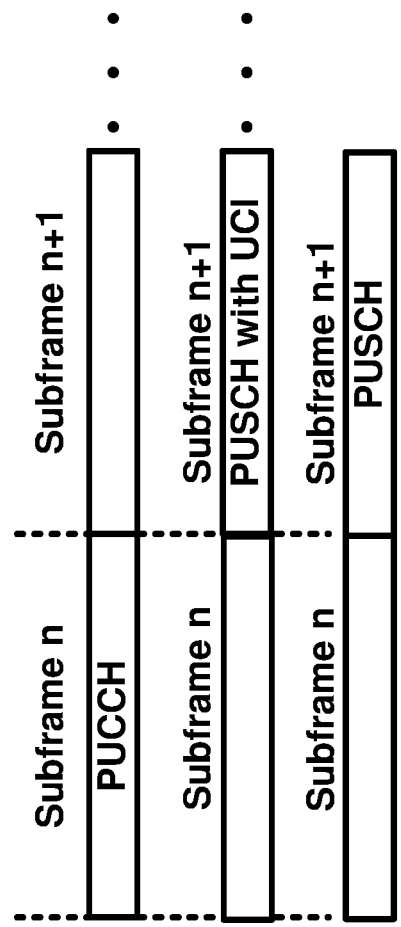
FIG. 11

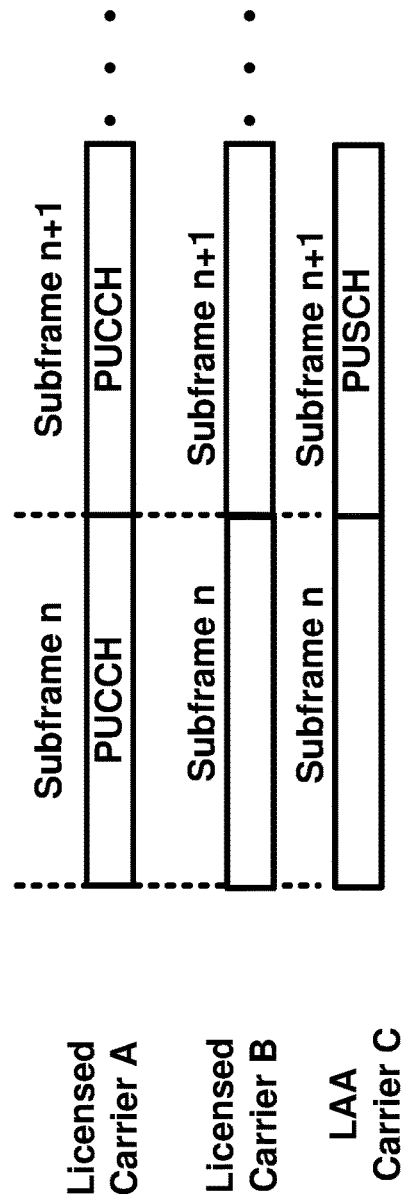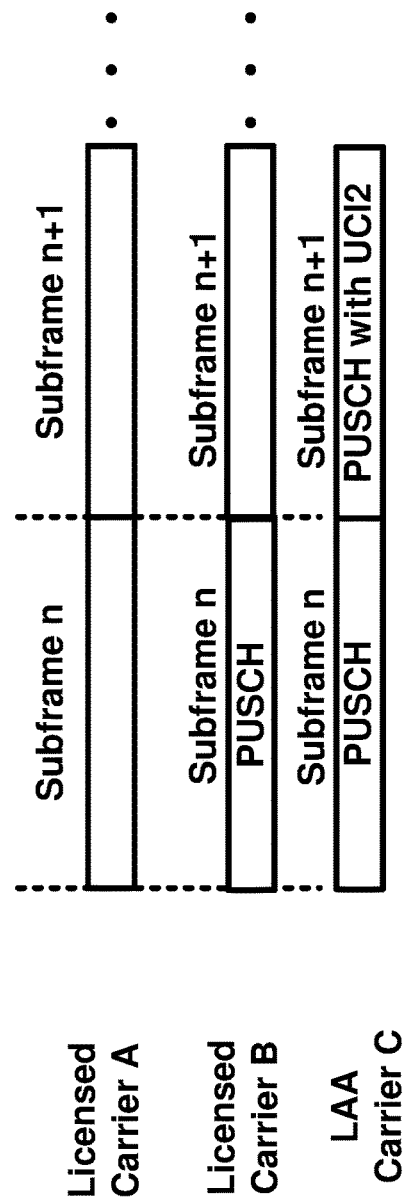
FIG. 12

TYPE 2 POWER HEADROOM OF A PRIMARY CELL

CROSS-REFERENCE TO RELATED APPLICATIONS

This application is a continuation of U.S. patent application Ser. No. 16/570,282, filed Sep. 13, 2019, now issued as U.S. Pat. No. 12,004,090, which is a continuation of U.S. patent application Ser. No. 15/606,932, filed May 26, 2017, now issued as U.S. Pat. No. 10,420,040, which claims the benefit of U.S. Provisional Application No. 62/341,732, filed May 26, 2016, all of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11 is an example diagram depicting uplink transmissions via a plurality of cells as per an aspect of an embodiment of the present disclosure.

FIG. 12 is an example diagram depicting uplink transmissions via a plurality of cells as per an aspect of an embodiment of the present disclosure.

DETAILED DESCRIPTION OF EMBODIMENTS

Figure 1:
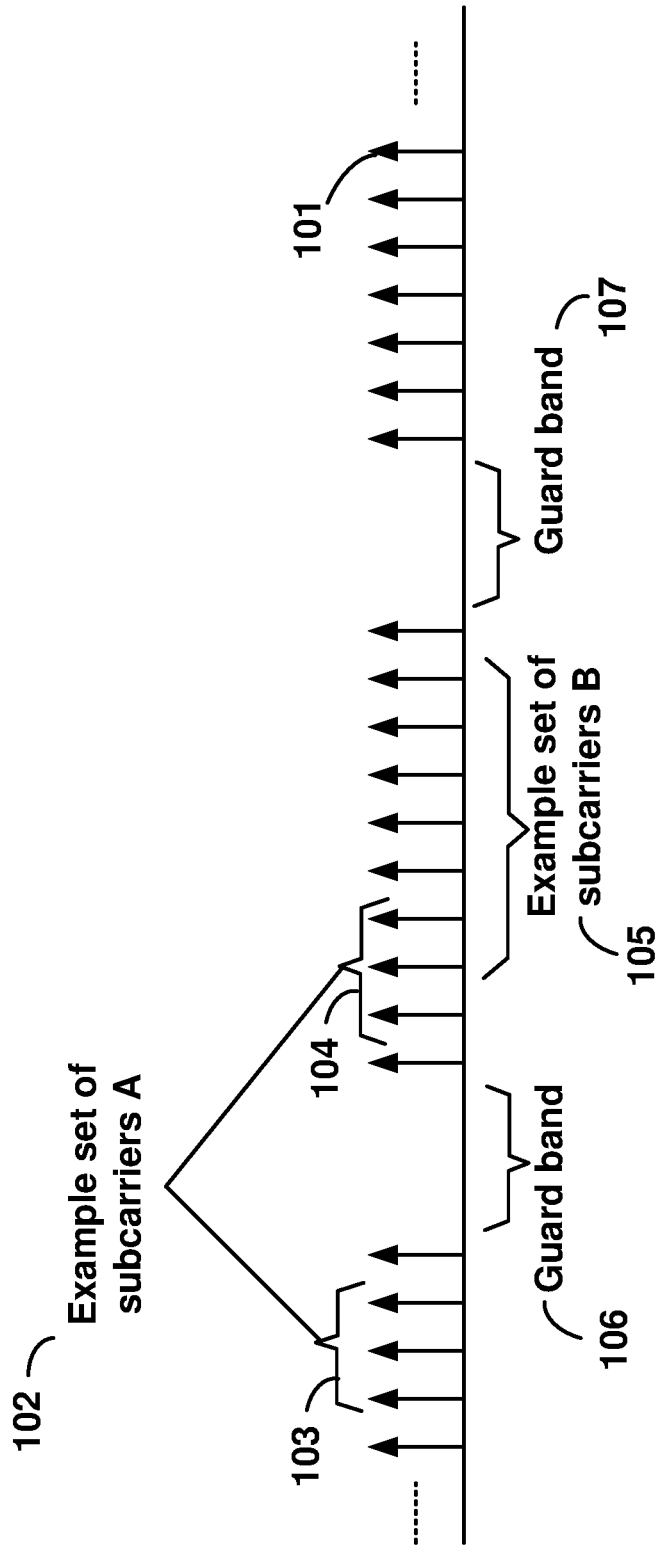
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution
MCG master cell group
MeNB master evolved node B
MIB master information block
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
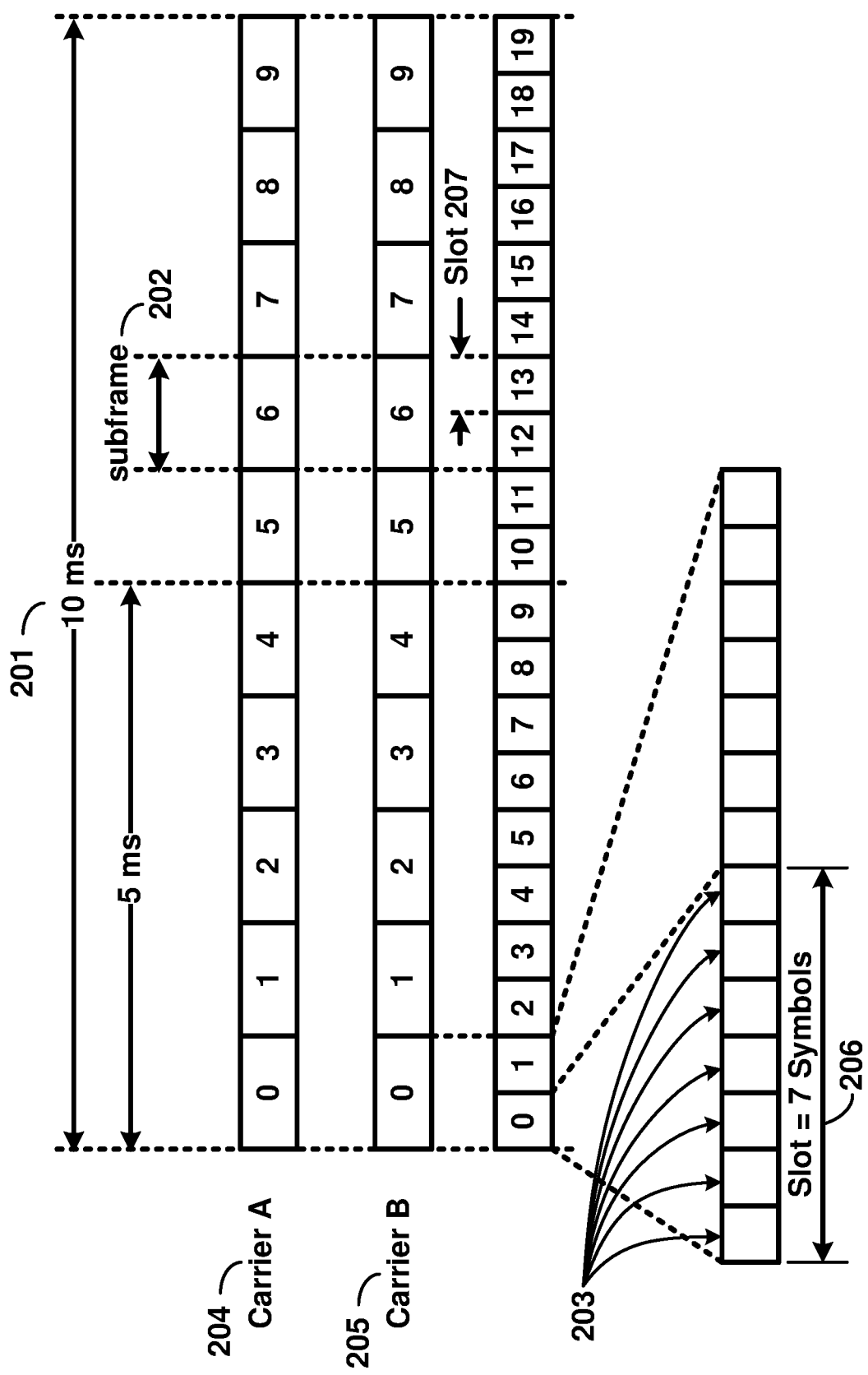
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
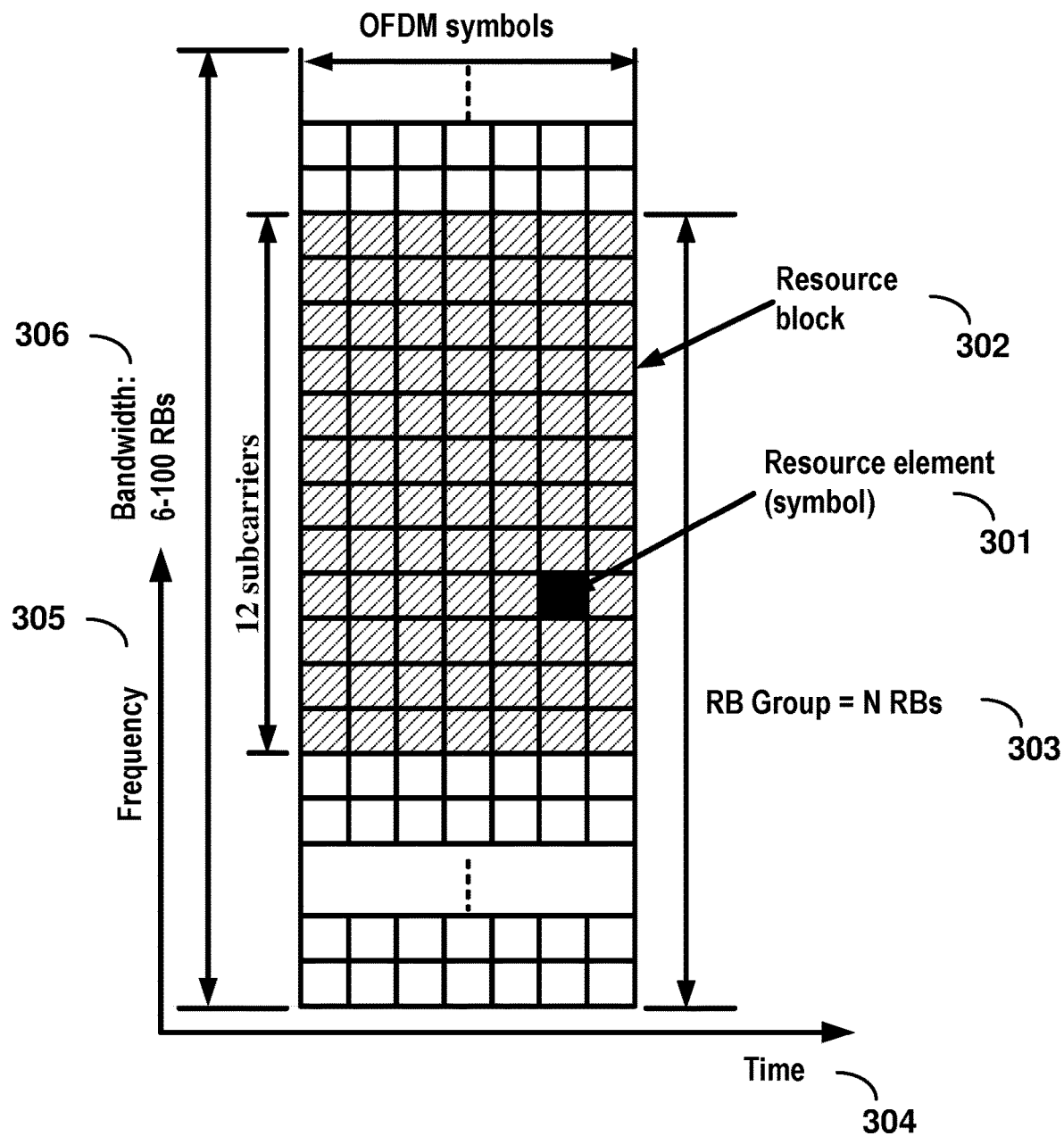
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
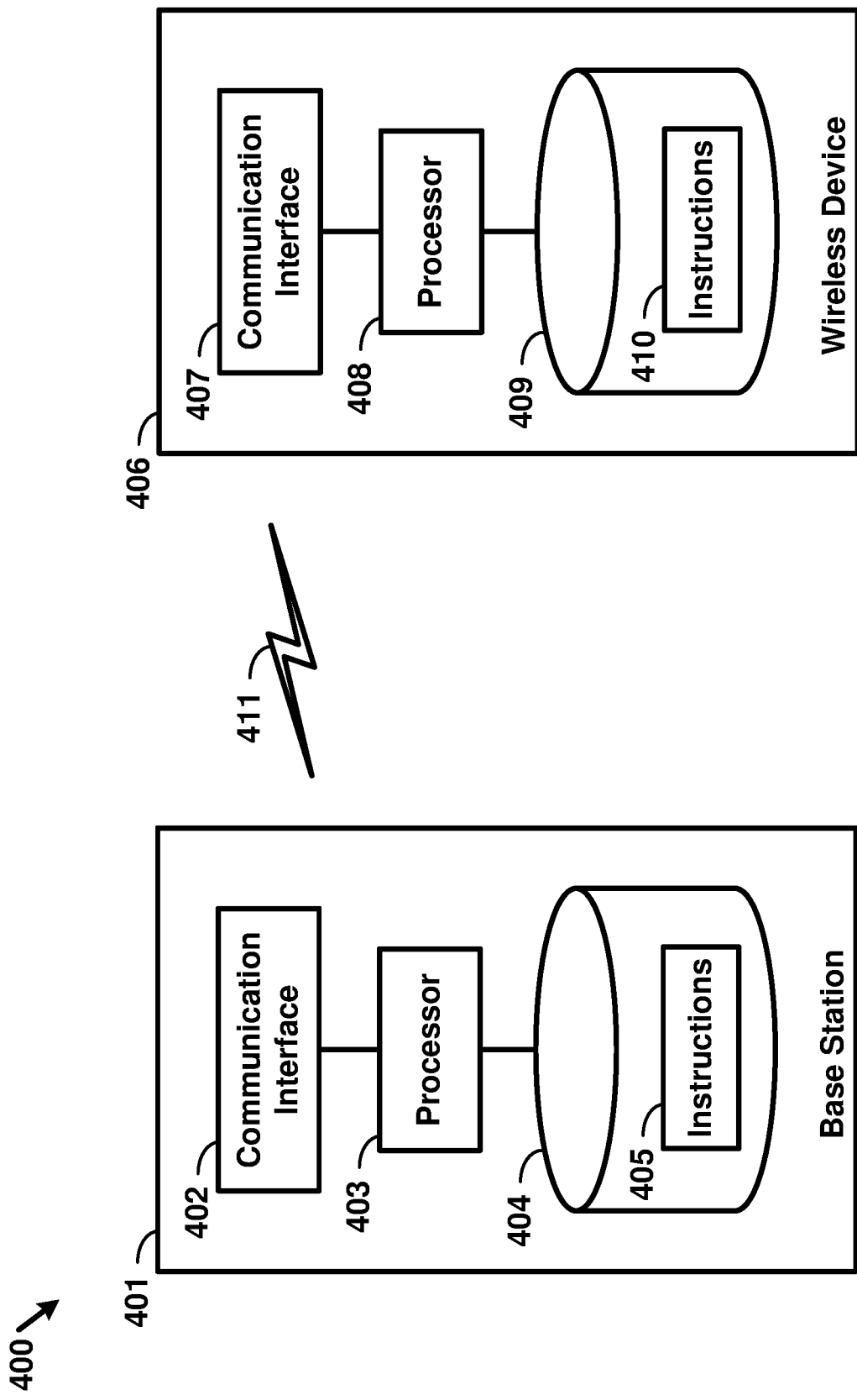
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMES/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
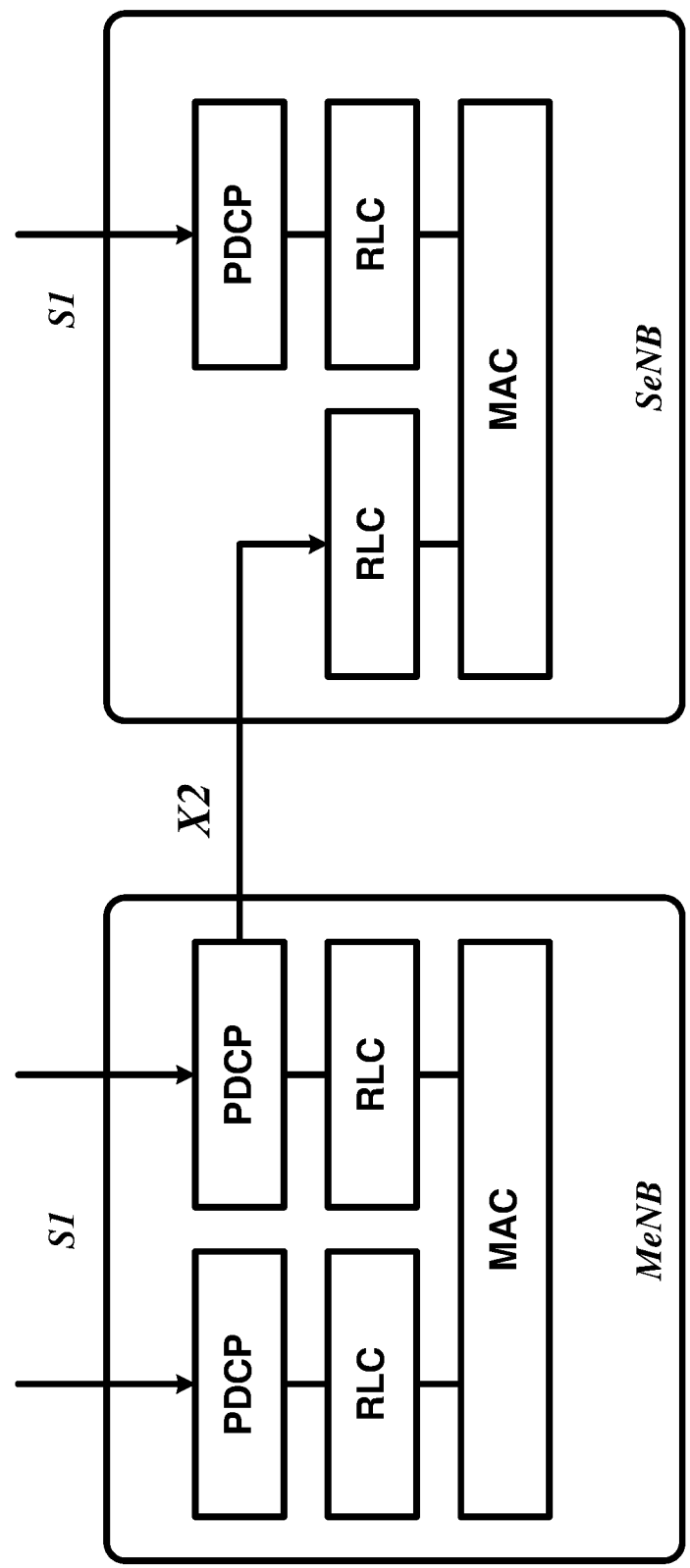
FIG. 6 is an example diagram for a protocol structure with CA and DC as per an aspect of an embodiment of the present disclosure.
Figure 7:
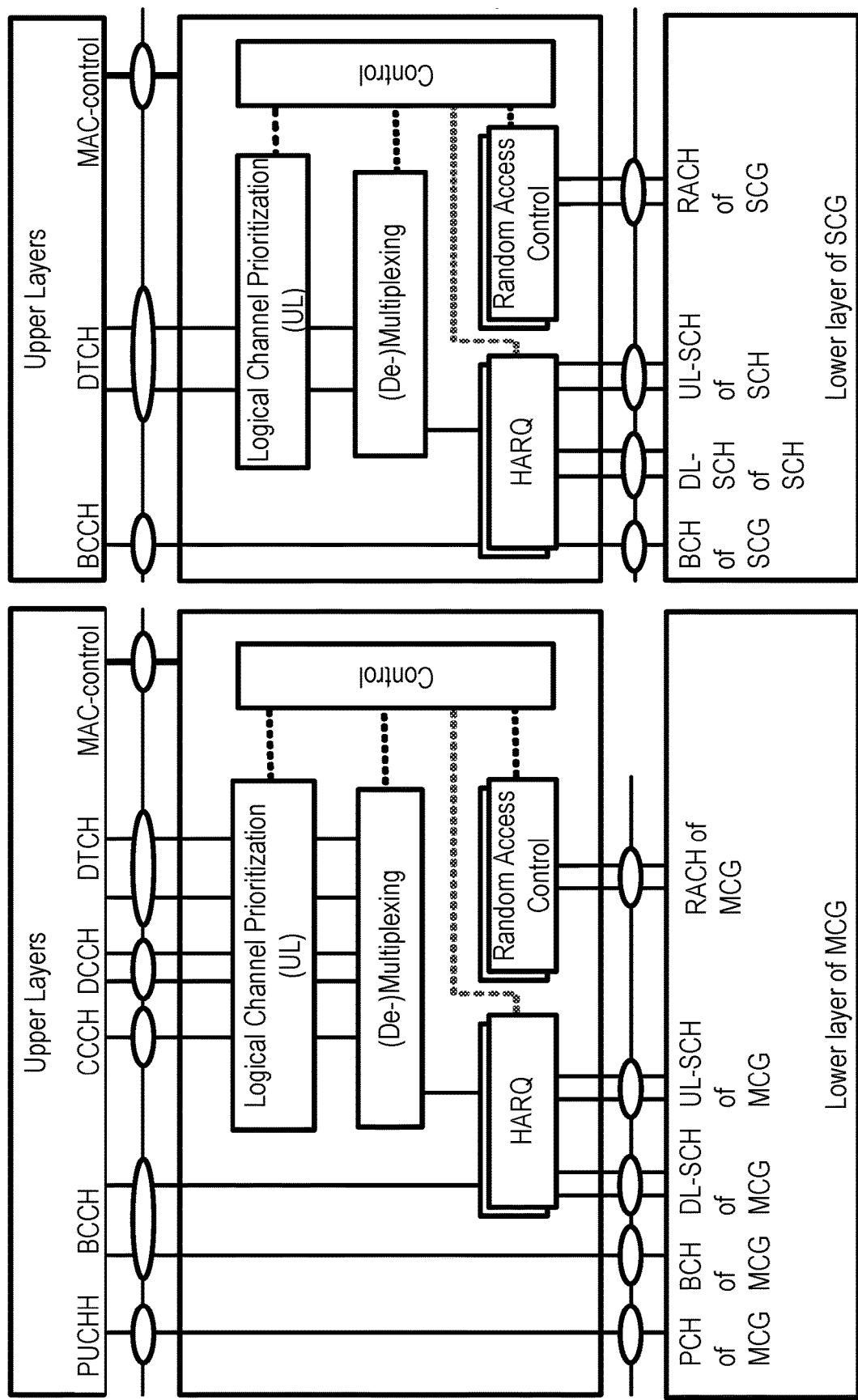
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
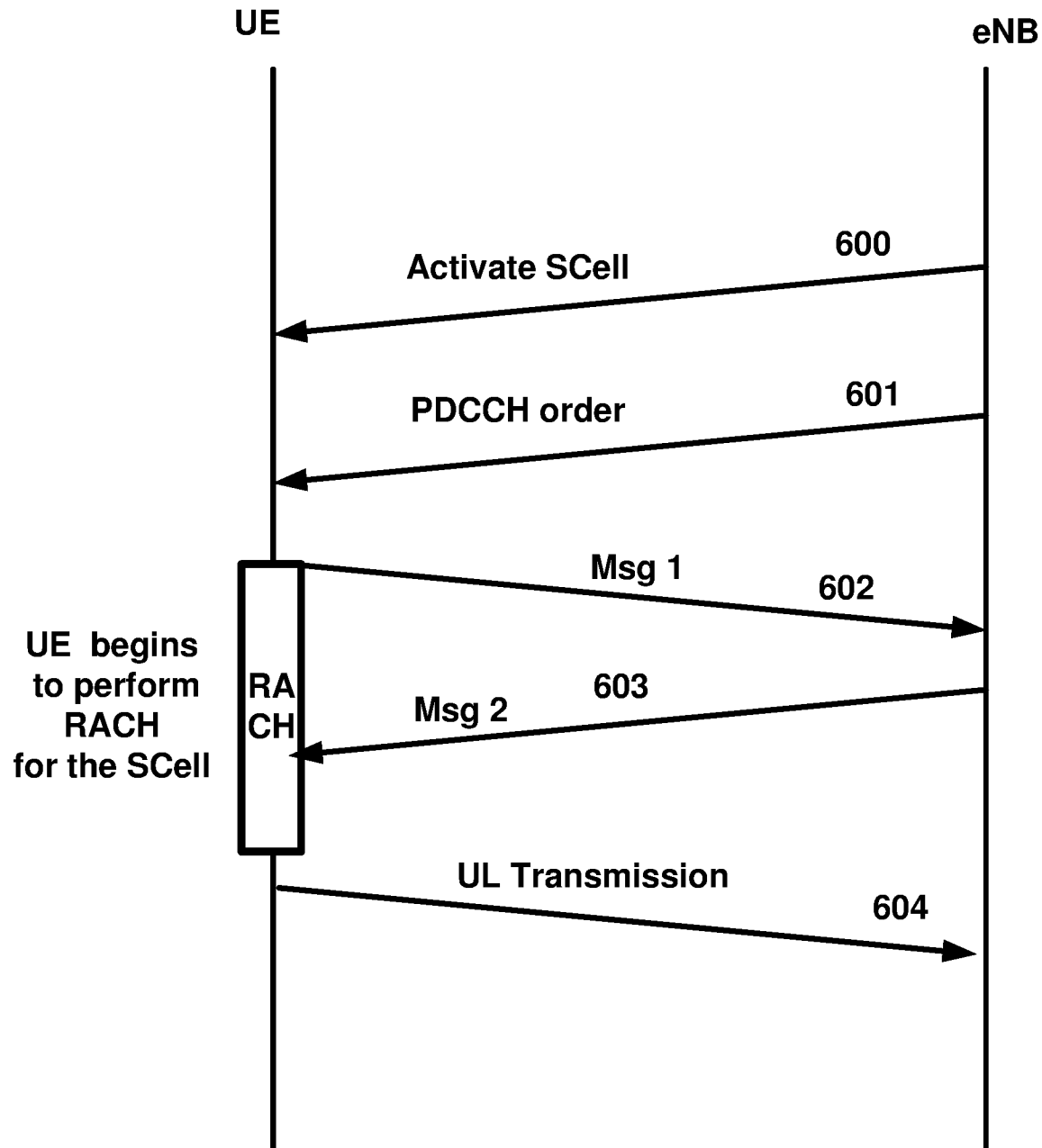
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602

(Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSFACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
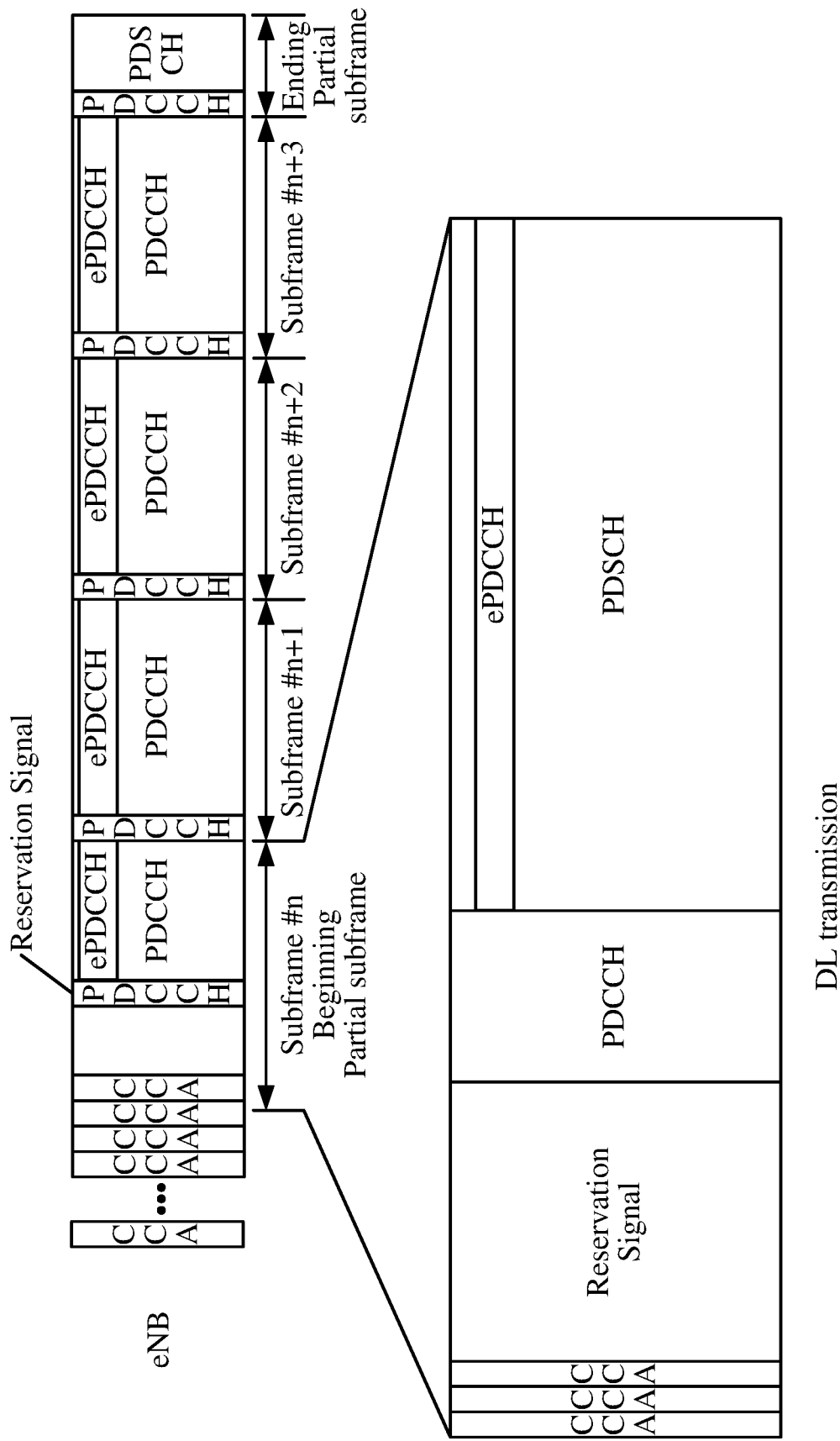
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the eNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiments, LTE transmission time may include frames, and a frame may include many subframes. The size of various time domain fields in the time domain may be expressed as a number of time units $T_s=1/(15000\times 2048)$ seconds. Downlink, uplink and sidelink transmissions may be organized into radio frames with $T_f=307200\times T_s=10$ ms duration.

In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame is $T_f=307200\cdot T_s=10$ ms long and may comprise 20 slots of length $T_{slot}=15360\cdot T_s=0.5$ ms, numbered from 0 to 19. A subframe may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200\cdot T_s=10$ ms may comprise of two half-frames of length $153600\cdot T_s=5$ ms. A half-frame may comprise five subframes of length $30720\cdot T_s=1$ ms. A subframe i may comprise two slots, 2i and 2i+1, of lenght $T_{slot}=15360\cdot T_s=0.5$ ms.

The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to $30720\cdot T_s=1$ ms.

Uplink-downlink configurations with both 5 ms and 10 ms downlink-to-uplink switch-point periodicity may be supported. In case of 5 ms downlink-to-uplink switch-point periodicity, the special subframe may exist in both half-frames. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least 1456 $T_s$.

In an example, in case multiple cells with different uplink-downlink configurations in the current radio frame are aggregated and the UE is not capable of simultaneous reception and transmission in the aggregated cells, the following constraints may apply. if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f=307200.7\cdot T_s=10$ ms long and comprises of 20 slots of length $T_{slot}=15360\cdot T_s=0.5$ ms, numbered from 0 to 19. A subframe may comprise as two consecutive slots where subframe comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

In an example embodiment, transmission of HARQ ACK for serving cells at licensed carriers on an LAA SCell may not be supported. Transmission of HARQ ACK and CSI for serving cells at unlicensed carriers on an LAA SCell may be supported. In an example, simultaneous Licensed-cell PUCCH and LAA SCell PUSCH transmission may be supported by a UE supporting LAA cell configuration. For example, an LAA SCell for UL may be configured to the UE only if simultaneous PUCCH in licensed spectrum and LAA SCell PUSCH transmission is supported by the UE. A UE supporting LAA cell configuration may transmit a UE capability message to an eNB. The capability message may comprise one or more parameters indicating that the UE supports simultaneous PUCCH and PUSCH transmission. An eNB may or may not configure simultaneous PUCCH and PUSCH parameter for a cell (e.g. PCell, PUCCH SCell, and/or PSCell).

In an example, the field simultaneous PUCCH-PUSCH in UE capability messages may define whether the UE baseband supports simultaneous transmission of PUCCH and PUSCH. This may be band agnostic. In an example, if the UE indicates support of baseband capability for simultaneous transmission of PUCCH and PUSCH using this field, and if the UE indicates support of RF capability for non-contiguous UL resource allocation within a component carrier for a particular E-UTRA radio frequency band, then the UE may support simultaneous transmission of PUCCH and PUSCH within a component carrier of the band. In an example, if the UE indicates support of baseband capability for simultaneous transmission of PUCCH and PUSCH using this field, and if the UE indicates support of carrier aggregation in UL, then the UE may support simultaneous transmission of PUCCH and PUSCH across any UL component carriers which the UE can aggregate. If the UE supports DC, this field may be applicable within a CG.

In an example embodiment, an eNB may transmit one or more RRC messages to a UE configuring one or more licensed cell and one or more LAA cells. An RRC message may comprise simultaneousPUCCH-PUSCH field. This field/parameter may indicate whether simultaneous PUCCH and PUSCH transmissions is configured. E-UTRAN may configure this field for the PCell, when the nonContiguousUL-RA-WithinCC-Info is set to supported in the band on which PCell is configured. E-UTRAN may configure this field for the PSCell, when the nonContiguousUL-RA-WithinCC-Info is set to supported in the band on which PSCell is configured. E-UTRAN may configure this field for the PUCCH SCell, when the nonContiguousUL-RA-WithinCC-Info is set to supported in the band on which PUCCH SCell is configured.

In an example embodiment, transmission of aperiodic CSI on an LAA SCell may be supported at least for aperiodic CSI for an unlicensed carrier. In an example, transmission of aperiodic CSI only (without UL-SCH) and/or aperiodic CSI with UL-SCH on an LAA cell may be supported. Enhanced LAA may support transmission of UCI including at least HARQ feedback on PUSCH within a cell group comprising one or more LAA SCells.

In an example, when simultaneous transmission of PUCCH and PUSCH is configured, HARQ-ACK(s) for licensed and/or unlicensed cell(s) may be transmitted on the PUCCH of the cell group. For example, see FIG. 11, a), subframes n and n+1.

In an example, when simultaneous transmission of PUCCH and PUSCH is not configured, HARQ-ACK(s) for licensed and/or unlicensed cell(s) may be transmitted on the PUCCH of the cell group if there is no PUSCH scheduling in this cell group. For example, see FIG. 11, b), subframe n.

In an example, when simultaneous transmission of PUCCH and PUSCH is not configured, and there is PUSCH on a licensed cell, HARQ-ACK(s) for licensed and/or unlicensed cell(s) may be transmitted on the PUSCH on a licensed cell with smallest cell index of the cell group. For example, see FIG. 11, b), subframe n+1.

In an example, when simultaneous transmission of PUCCH and PUSCH is not configured, and there is (are) only PUSCH(s) on unlicensed cell(s), HARQ-ACK(s) for licensed and/or unlicensed cell(s) is transmitted on the PUCCH. In an example, the PUSCH(s) on unlicensed cells may be transmitted in parallel with PUCCH of a licensed cell independent of configuration of simultaneous transmission of PUCCH and PUSCH for the licensed cell comprising PUCCH in a PUCCH cell group. A UE may or may not be configured with simultaneous PUSCH/PUCCH for licensed cell(s) of a PUCCH group independent of the configuration of an LAA cell for the UE. For example, see FIG. 12, a), subframe n+1.

Rel-13 HARQ-ACK timing for LAA SCells may be implemented for this HARQ-ACK feedback mode. In an example, when a PUCCH group contains licensed cell(s) and unlicensed cell(s) and if simultaneous transmission of PUCCH and PUSCH is not configured and UCGs are not configured, the PUSCH on a licensed cell with smallest cell index among only licensed cells is used for the HARQ-ACK transmission. If no licensed PUSCH is scheduled but there is at least one unlicensed PUSCH scheduled, then PUCCH is used for the HARQ-ACK transmission.

In an example, to achieve unlicensed HARQ-ACK offloading, the CA UCI feedback framework may enable that HARQ-ACKs for licensed cells and LAA cells are transmitted on licensed cells. Offloading HARQ feedback on LAA cells may be supported in some situations where there is HARQ feedback for LAA cells. For example, if there are HARQ feedback for LAA SCells and also PUSCH(s) on LAA SCells, the HARQ feedback for LAA cells may be transmitted on one of LAA PUSCHs, when simultaneous PUCCH and PUSCH is not configured. For example, see FIG. 12, b), subframe n+1.

Figure 13:
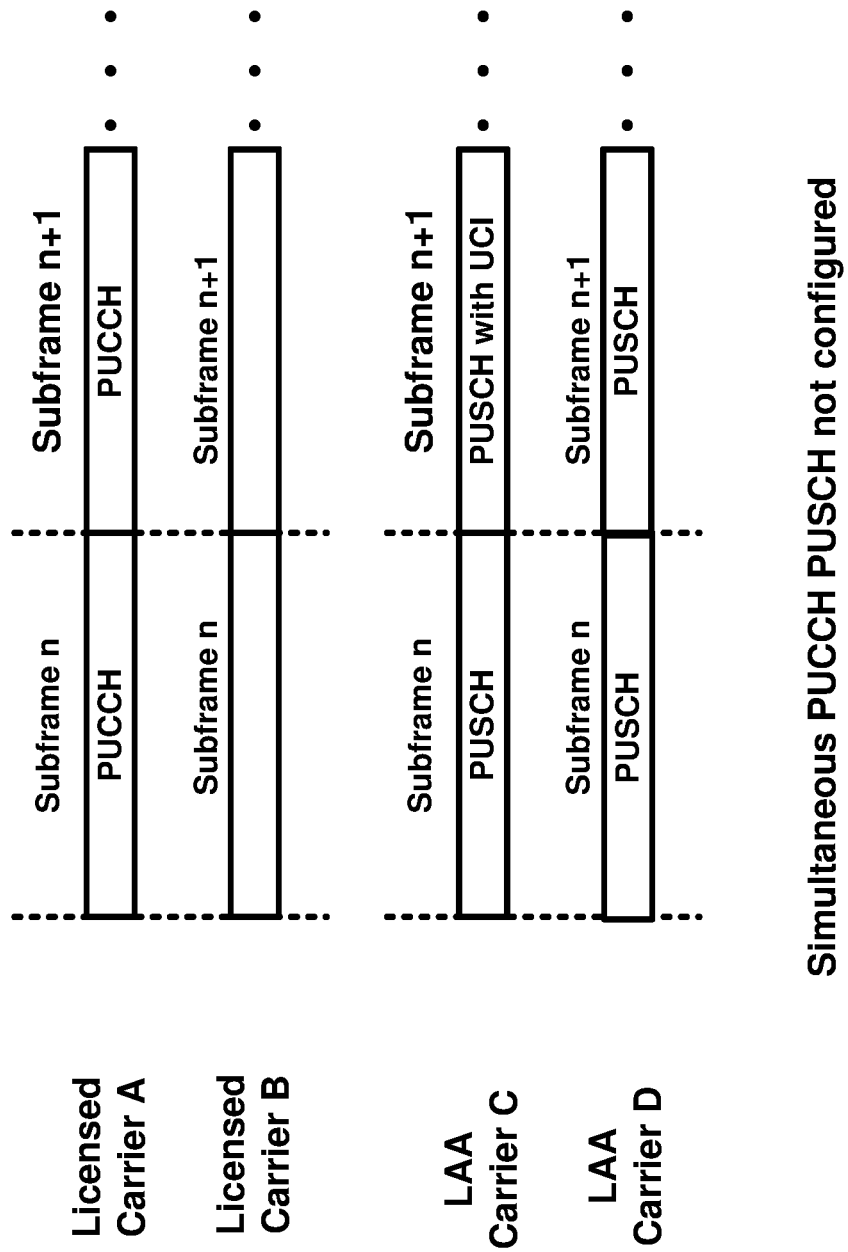
FIG. 13 is an example diagram depicting uplink transmissions via a plurality of cells as per an aspect of an embodiment of the present disclosure.

There is a need to define UE behavior when simultaneous transmission of PUCCH and PUSCH is not configured for PCell, PUCCH SCell and/or PSCell and when at least one LAA cell is configured. In an example embodiment, when simultaneous transmission of PUCCH and PUSCH is not configured for a cell comprising PUCCH, PUCCH/PUSCH transmission rules may be applied to the corresponding PUCCH group and not to LAA cells in a configured UCG. In an example embodiment, when simultaneous transmission of PUCCH and PUSCH is not configured for a cell comprising PUCCH, PUCCH/PUSCH transmission rules may be applied to the licensed cells in a PUCCH group and not to LAA cells configured by the eNB in MCG or SCG (MeNB or SeNB). This may enable parallel transmission of PUCCH on a cell with a configured PUCCH (PCell, PUCCH SCell and/or PSCell) and PUSCH(s) of an LAA cell when simultaneous transmission of PUCCH and PUSCH is not configured for the cell comprising PUCCH. When simultaneous transmission of PUCCH and PUSCH is not configured for PCell, PUCCH SCell and/or PSCell, the rules for simultaneous transmission of PUCCH and PUSCH may be applied to licensed cell(s) in a corresponding PUCCH group and may not be applied to unlicensed cells (of the PUCCH group or a UCG). For example, See FIG. 13.

In an example, when simultaneous transmission of PUCCH and PUSCH is not configured, HARQ-ACK(s) for licensed and/or unlicensed cell(s) of the corresponding PUCCH group may be transmitted on the PUCCH of the cell group if there is no PUSCH scheduling on a licensed cell in this cell PUCCH group. PUSCH(s) on unlicensed cell(s) may be transmitted in parallel with PUCCH of a corresponding PUCCH cell group. PUSCH(s) on unlicensed cell(s) of a configured UCG may be transmitted in parallel with PUCCH of a corresponding PUCCH cell group. Legacy release 13 behavior on transmission of PUCCH and PUSCH (based on RRC configuration of simultaneous transmission of PUCCH and PUSCH) may be applied to licensed cells of a PUCCH group, but not to unlicensed cells.

In an example, when simultaneous transmission of PUCCH and PUSCH is not configured, and there is PUSCH on a licensed cell, HARQ-ACK(s) for licensed and/or unlicensed cell(s) may be transmitted on the PUSCH on a licensed cell with smallest cell index of the cell group. LAA cells may transmit PUSCH in parallel with other PUSCH of a PUCCH group. HARQ feedback for LAA cell(s) of a UCG may be transmitted on the UCG in parallel with transmission of PUCCH and/or PUSCH on cell(s) of a PUCCH group.

In an example, when simultaneous transmission of PUCCH and PUSCH is not configured for a cell in a PUCCH group, and there is (are) PUSCH(s) on unlicensed cell(s), HARQ-ACK(s) for licensed and/or unlicensed cell(s) may be transmitted on the PUCCH. PUSCH on LAA cells may be transmitted in parallel with PUCCH of a PUCCH cell group.

This may enhance PUSCH transmission in uplink of carrier aggregation when LAA cell(s) are configured. PUSCH(s) on one or more LAA cells may be transmitted in parallel with a PUCCH configured in a PUCCH group even if simultaneous transmission of PUCCH and PUSCH is not configured.

Example power headroom trigger condition configuration parameters in an RRC message are shown below. Other examples may be implemented. phr-Config CHOICE {release NULL, setup SEQUENCE {periodicPHR-Timer ENUMERATED {sf10, sf20, sf50, sf100, sf200, sf500, sf1000, infinity}, prohibitPHR-Timer ENUMERATED {sf0, sf10, sf20, sf50, sf100, sf200, sf500, sf1000}, dl-Pathloss-Change ENUMERATED {dB1, dB3, dB6, infinity}}.

The parameter periodicPHR-Timer may be a timer for PHR reporting. Value in number of sub-frames. Value sf10 corresponds to 10 subframes, sf20 corresponds to 20 sub-frames and so on.

The parameter prohibitPHR-Timer may be a timer for PHR reporting. Value in number of sub-frames. Value sf0 corresponds to 0 subframes, sf100 corresponds to 100 sub-frames and so on.

The parameter dl-PathlossChange may be DL Pathloss Change and the change of the required power backoff due to power management (as allowed by P-MPRc) for PHR reporting. Value in dB. Value dB1 corresponds to 1 dB, dB3 corresponds to 3 dB and so on. The same value may apply for each serving cell (although the associated functionality is performed independently for each cell).

A Power Headroom reporting procedure may be employed to provide a serving eNB with information about the difference between nominal UE maximum transmit power and estimated power for UL-SCH transmission per activated serving cell. The Power Headroom reporting procedure may also to provide a serving eNB with information about the difference between the nominal UE maximum power and the estimated power for an UL-SCH and PUCCH transmission on a SpCell and/or a PUCCH SCell.

The reporting period, delay and mapping of Power Headroom may be defined. An RRC may control Power Headroom reporting by configuring at least two timers period-icPHR-Timer and prohibitPHR-Timer, and by signalling dl-PathlossChange which may set the change in measured downlink pathloss and the power backoff due to power management (as allowed by P-MPRc) to trigger a PHR.

In an example embodiment, a Power Headroom Report (PHR) may be triggered if one or more of the following events occur (not listed in any particular order). First, a prohibitPHR-Timer expires or has expired and the path loss has changed more than dl-PathlossChange dB for at least one activated serving cell of any MAC entity which is used as a pathloss reference since the last transmission of a PHR in this MAC entity when the MAC entity has UL resources for new transmission. Second, a periodicPHR-Timer expires. Third, upon configuration or reconfiguration of the power headroom reporting functionality by upper layers, which is not used to disable the function. Fourth, activation of an SCell of any MAC entity with a configured uplink; Fifth, addition of an PSCell; and/or sixth, a prohibitPHR-Timer expires or has expired, when the MAC entity has UL resources for a new transmission, and the following is true in this TTI for any of the activated serving cells of any MAC entity with a configured uplink (there may be UL resources allocated for transmission or there may be a PUCCH transmission on this cell, and the required power backoff due to power management (as allowed by P-MPRc) for this cell has changed more than dl-PathlossChange dB since the last transmission of a PHR when the MAC entity had UL resources allocated for transmission or PUCCH transmission on this cell).

In an example implementation, the MAC entity may avoid triggering a PHR when the required power backoff due to power management decreases temporarily (e.g. for up to a few tens of milliseconds) and it may avoid reflecting such temporary decrease in the values of PCMAX,c/PH when a PHR is triggered by other triggering conditions.

If the MAC entity has UL resources allocated for a new transmission for this TTI, the MAC entity may start a periodicPHR-Timer if it is the first UL resource allocated for a new transmission since the last MAC reset. A UE may transmit a corresponding PHR report if a Power Headroom reporting procedure determines that at least one PHR has been triggered and not cancelled, and if the allocated UL resources can accommodate a corresponding PHR MAC control element plus its subheader for a corresponding PHR configuration as a result of logical channel prioritization.

For example, a UE may transmit a corresponding PHR report for one or more activated serving cells with a configured uplink if: the allocated UL resources can accommodate a PHR MAC control element plus its subheader if neither extendedPHR nor dualConnectivityPHR is configured, and/or an Extended PHR MAC control element plus its subheader if an extendedPHR is configured, and/or a Dual Connectivity PHR MAC control element plus its subheader if dualConnectivityPHR is configured as a result of logical channel prioritization.

In LTE Release-10 carrier aggregation (CA), an Extended Power Headroom Report (PHR) MAC Control Element (CE) was introduced to accommodate type 2 power headroom (PH) of PCell and type 1 PHs of SCells. Type 2 PH may be employed when simultaneousPUCCH-PUSCH configuration is supported. In DC, since a PUCCH may be transmitted on a PCell and an PSCell, the PHR MAC CE may contain 2 type 2 PHs and several type 1 PHs. DC PHR MAC CE was introduced to include an extra type 2 PH of a PSCell. For DC, PH may be reported to both eNBs separately, but the PHR may include PH for active serving cells.

In LTE Release-13, three types of power headroom related MAC CEs are defined: 1) Power Headroom Report MAC CE, 2) Extended Power Headroom Report MAC CE, and 3) Dual Connectivity Power Headroom. A MAC CE may be identified by a logical channel ID (LCID) field in a MAC subheader. The LCID field may identify the logical channel instance of the corresponding MAC SDU and/or the type of the corresponding MAC control element and/or padding. Extended PHR may have two formats ExtendedPHR and ExtendedPHR2.

Values of LCID for UL-SCH MAC CE in Release-13 are defined in 3GPP TS 36.321 V13.1.0 as: Index 11000: Dual Connectivity Power Headroom Report; Index 11001: Extended Power Headroom Report; and Index 11010: Power Headroom Report If an extendedPHR mode is configured and when conditions for transmission of a PHR are met, a UE may generate and transmit an Extended PHR MAC control element identified by, for example, LCID=11001.

If a dualConnectivityPHR mode is configured and when conditions for transmission of a PHR are met, a UE may generate and transmit a Dual Connectivity Power Headroom Report identified by, for example, LCID=11000.

If a PHR is configured but neither extendedPHR mode nor dualConnectivityPHR mode is configured, and when conditions for transmission of a PHR are met, then a UE may generate and transmit a Power Headroom Report with, for example, an LCID of 11010.

An eNB may transmit one or more RRC configuration parameters comprising configuration parameters of one or more cells. The configuration parameters for a cell may comprise configuration parameters for power headroom. The UE may use RRC configuration parameters to determine which type of the PHR headroom the UE should transmit.

In an example embodiment, a UE may transmit its capability regarding supporting simultaneousPUCCH-PUSCH to the eNB in an RRC UE Capability IE. For example: simultaneousPUCCH-PUSCH-r10: ENUMERATED {supported} OPTIONAL. The eNB may then configure simultaneousPUCCH-PUSCH for PCell, PSCell and/or PUCCH SCell using information elements in RRC control messages. For example: simultaneousPUCCH-PUSCH ENUMERATED {true} OPTIONAL, Need OR. simultaneousPUCCH-PUSCH IE may indicate whether simultaneous PUCCH and PUSCH transmissions is configured in a PUCCH group. In an example, E-UTRAN may configure this field, when the nonContiguousUL-RA-WithinCC-Info is set to supported in the band on which PCell (or e.g. PUCCH SCell) is configured.

The simultaneous transmission of PUCCH and PUSCH may occur when UE is configured with LAA cells and simultaneousPUCCH-PUSCH is not configured.

In an example embodiment, when one or more PUCCH group and one or more LAA cells are configured, UCI of cells of a PUCCH group may be transmitted on a PUSCH the PUCCH cell group. In an example embodiment, when one or more PUCCH group and one or more UCGs are configured, UCI of cells of a PUCCH group may be transmitted on a PUSCH the PUCCH cell group, UCIs (e.g. aperiodic CSI and/or HARQ feedback) of cells of a UCG is transmitted on one or more PUSCH of the UCG. A UE may not multiplex UCIs of a PUCCH group on PUSCH of a serving cell of a UCG. A UE may multiplex UCIs of a UCG on the PUSCH of a serving cell in the UCG.

When PUCCH groups are configured, the configuration of simultaneousPUCCH-PUSCH may be configured independently on PCell and/or PUCCH SCell. For example, the parameter simultaneousPUCCH-PUSCH may be configured on both PCell and PUCCH SCell (set as true). For example, simultaneousPUCCH-PUSCH may be configured for one of PCell or PUCCH SCell. Or in another example, simultaneousPUCCH-PUSCH may not be configured on either PCell or PUCCH SCell.

In an example embodiment, independent of whether simultaneousPUCCH-PUSCH is configured (set to true) or not, UCI in one PUCCH group may be transmitted in PUCCH of the PUCCH group, in parallel with PUSCH transmission on one or more LAA cells. Even when simultaneousPUCCH-PUSCH is not configured for PCell, PUCCH SCell, and/or PSCell, parallel transmission of PUCCH in a PUCCH group and PUSCH in one or more LAA cell is still possible. If a UE is configured with LAA cells, simultaneous transmission of PUCCH and PUSCH may occur independent of the configuration of simultaneousPUCCH-PUSCH on PCell, PUCCH SCell, and/or PSCell.

In an example embodiment, there is a need for an enhanced PHR process when LAA cells are configured. Existing PHR processes may be enhanced to consider scenarios when one or more LAA cells are configured. In current mechanisms, Type 2 PHR for a PCell is transmitted depending on simultaneousPUCCH-PUSCH and/or PUCCH SCell configuration. In an example embodiment, a PHR MAC CE comprises Type 2 PHR for a cell in response to (when) at least one LAA cell, with uplink, is configured and activated. This condition applies when an LAA cell is configured with an uplink and the LAA cell is activated (both uplink condition and activation condition are required). This is regardless of whether simultaneousPUCCH-PUSCH and/or PUCCH SCell are configured or not. This mechanism provides required enhanced information to an eNB to perform uplink scheduling and/or power control when one more LAA cells, with uplink, are configured and activated. In an example, when one or more LAA cells, with uplink, are configured and activated, there is a possibility that parallel PUSCH and PUCCH are transmitted even when simultaneousPUCCH-PUSCH is not configured.

In an example embodiment, LAA cell(s), with uplink, may be deactivated in some scenarios. In an example, LAA cell(s) may not be configured with an uplink. In an example, if and when all the configured LAA cell(s) with uplink are deactivated or when all the configured LAA cells are configured without uplink, existing processes may be implemented. Example embodiments improve PHR process. In an example embodiment, Type 2 PHR for a cell with PUCCH may be transmitted when one or more LAA cells, with uplink, are configured and at least one LAA cell, with uplink, is activated, regardless of whether simultaneousPUCCH-PUSCH is configured or not. In an example embodiment, a PHR MAC CE comprises a Type 2 PHR value of the Pcell, at least in response to meeting the following conditions: at least one LAA is configured, at least one of the at least one configured LAA have a configured uplink, and the LAA with uplink is activated. These conditions for including Type 2 PHR value of Pcell enhances uplink scheduling and power control performance while considering overhead reduction in the uplink. If any of these conditions are removed, uplink overhead may increase without potentially increasing efficiency in uplink radio performance.

In an example embodiment, the above process may be enhanced by including the activation criteria in the process. The UE may need to further check the activation status of one or more cells (with configured uplink) for transmission of PHR type 2. When extendedPHR(2) PHR is reported, the mechanism for reporting Type 2 PH may be according to the following process.

If simultaneousPUCCH-PUSCH is configured, OR, if at least one LAA cell with uplink is configured and activated (regardless of configuration of simultaneousPUCCH-PUSCH), perform at least the following: obtain the value of the Type 2 power headroom for the PCell; and/or obtain the value for the corresponding PCMAX,c field from the physical layer.

In an example, the condition "at least one LAA cell with uplink is configured and activated" may be equally replaced with "at least one LAA cell with uplink is activated". An activated LAA cell is also a configured LAA cell.

In an example embodiment, the process is enhanced by including the activation criteria in the process. The UE may need to further check the activation status of one or more LAA cells, with uplink, for transmission of PHR type 2. When extendedPHR2 PHR is reported, the mechanism for reporting Type 2 PH may be according to the following process.

In an example embodiment, when extendedPHR2 PHR is reported, the mechanism for reporting Type 2 PH may be according to the following process. If a PUCCH SCell is configured and activated, OR, if at least one LAA cell with uplink is configured and activated (regardless of configuration of simultaneousPUCCH-PUSCH), perform at least the following: obtain the value of the Type 2 power headroom for the PCell; obtain the value for the corresponding PCMAX,c field from the physical layer; obtain the value of the Type 2 power headroom for the PUCCH Scell (if configured and activated); and/or obtain the value for the corresponding PCMAX,c field from the physical layer. Otherwise (else), if simultaneousPUCCH-PUSCH is configured for PCell, perform at least the following: obtain the value of the Type 2 power headroom for the PCell; and/or obtain the value for the corresponding PCMAX,c field from the physical layer.

In an example embodiment, the process may be enhanced by including the activation criteria in the process. The UE may need to further check the activation status of one or more LAA cells for transmission of PHR type 2. When dualConnectivityPHR PHR is reported, the mechanism for reporting Type 2 PH may be according to the following process.

In an example embodiment, when dualConnectivityPHR PHR is reported, the mechanism for reporting Type 2 PH may be according to the following process. If simultaneousPUCCH-PUSCH is configured, OR, if at least one LAA cell with uplink is configured and activated (regardless of configuration of simultaneousPUCCH-PUSCH), perform at least the following: obtain the value of the Type 2 power headroom for the SpCell; and/or obtain the value for the corresponding PCMAX,c field for the SpCell from the physical layer.

In an example, the condition "at least one LAA cell with uplink is configured and activated" may be equally replaced with "at least one LAA cell with uplink is activated". An activated LAA cell is also a configured LAA cell.

In an example embodiment, the process may be enhanced by including the activation criteria in the process. The UE may need to further check the activation status of one or more LAA cells for transmission of PHR type 2.

An example procedure for reporting extended power headroom is shown below:

If the MAC entity has UL resources allocated for new transmission for this TTI the MAC entity may: if it is the first UL resource allocated for a new transmission since the last MAC reset, start periodicPHR-Timer; if the Power Headroom reporting procedure determines that at least one PHR has been triggered and not cancelled, and; if the allocated UL resources can accommodate the MAC control element for PHR which the MAC entity is configured to transmit, plus its subheader, as a result of logical channel prioritization: if extendedPHR is configured: for a activated Serving Cell with configured uplink: obtain the value of the Type 1 power headroom; if the MAC entity has UL resources allocated for transmission on this Serving Cell for this TTI: obtain the value for the corresponding PCMAX,c field from the physical layer.

If simultaneousPUCCH-PUSCH is configured, OR, if at least one LAA cell with uplink is configured and activated (regardless of configuration of simultaneousPUCCH-PUSCH), perform at least the following: obtain the value of the Type 2 power headroom for the PCell; and/or obtain the value for the corresponding PCMAX,c field from the physical layer; instruct the Multiplexing and Assembly procedure to generate and transmit an Extented PHR MAC control element for extendedPHR based on the values reported by the physical layer.

Otherwise (else) if extendedPHR2 is configured: for a activated Serving Cell with configured uplink: obtain the value of the Type 1 power headroom; if the MAC entity has UL resources allocated for transmission on this Serving Cell for this TTI: obtain the value for the corresponding PCMAX,c field from the physical layer. Otherwise (else) if a PUCCH SCell is configured and activated, OR, if at least one LAA cell with uplink is configured and activated (regardless of configuration of simultaneousPUCCH-PUSCH), perform at least the following: obtain the value of the Type 2 power headroom for the PCell and PUCCH SCell (if configured and activated); and/or obtain the values for the corresponding PCMAX,c fields from the physical layer; else, perform at least the following: if simultaneousPUCCH-PUSCH is configured for the PCell: obtain the value of the Type 2 power headroom for the PCell; and/or obtain the value for the corresponding PCMAX,c field from the physical layer. The UE may instruct the Multiplexing and Assembly procedure to generate and transmit an Extended PHR MAC control element for extendedPHR2 according to configured ServCellIndex and the PUCCH(s) for the MAC entity based on the values reported by the physical layer.

Otherwise (else) if dualConnectivityPHR is configured: for an activated Serving Cell with configured uplink associated with any MAC entity: obtain the value of the Type 1 power headroom; if this MAC entity has UL resources allocated for transmission on this Serving Cell for this TTI or if the other MAC entity has UL resources allocated for transmission on this Serving Cell for this TTI and phr-ModeOtherCG is set to real by upper layers, perform at least the following: obtain the value for the corresponding PCMAX,c field from the physical layer; if simultaneousPUCCH-PUSCH is configured, OR, if at least one LAA cell with uplink is configured and activated (regardless of configuration of simultaneousPUCCH-PUSCH), perform at least the following: obtain the value of the Type 2 power headroom for the SpCell; obtain the value for the corresponding PCMAX,c field for the SpCell from the physical layer; and/or obtain the value of the Type 2 power headroom for the SpCell of the other MAC entity. If phr-ModeOtherCG is set to real by upper layers: obtain the value for the corresponding PCMAX,c field for the SpCell of the other MAC entity from the physical layer. The UE (e.g. MAC entity) may instruct the Multiplexing and Assembly procedure to generate and transmit a Dual Connectivity PHR MAC control element based on the values reported by the physical layer. Else, the UE may perform at least the following: obtain the value of the Type 1 power headroom from the physical layer; and/or instruct the Multiplexing and Assembly procedure to generate and transmit a PHR MAC control element based on the value reported by the physical layer.

When PHR is transmitted, the UE may start or restart periodicPHR-Timer; start or restart prohibitPHR-Timer; and/or cancel all triggered PHR(s).

There may be at least two types of UE power headroom reports, Type 1 and Type 2. A UE power headroom PH may be valid for subframe i for serving cell c.

If the UE is configured with an SCG, and if a higher layer parameter phr-ModeOtherCG-r12 for a CG indicates 'virtual' for power headroom reports transmitted on that CG, the UE may compute PH assuming that it does not transmit a PUSCH/PUCCH on any serving cell of the other CG.

If the UE is configured with an SCG for computing power headroom for cells belonging to MCG, the term 'serving cell' may refer to a serving cell belonging to the MCG. For computing power headroom for cells belonging to an SCG, the term 'serving cell' may refer to a serving cell belonging to the SCG. The term 'primary cell' may refer to the PSCell of the SCG. If the UE is configured with a PUCCH SCell for computing power headroom for cells belonging to a primary PUCCH group, the term 'serving cell' may refer to a serving cell belonging to the primary PUCCH group. For computing power headroom for cells belonging to a secondary PUCCH group, the term 'serving cell' may refer to serving cell belonging to the secondary PUCCH group. The term 'primary cell' may refer to the PUCCH-SCell of the secondary PUCCH group.

An example Type 1 and Type 2 power headroom calculations is presented here. Example parameters and example calculation method is presented in standard document 3GPP TS 36.213 standard documents of the corresponding LTE release.

Type 1: If the UE transmits PUSCH without PUCCH in subframe i for serving cell c, power headroom for a Type 1 report may be computed using $$PH_{type1c}(i) = P_{CMAX,c}(i) - \{10 \log_{10}(M_{PUSCHc}(i)) + P_{O\_PUSCHc}(j) + \alpha_c(j) \cdot PL_c + \Delta_{TF,c}(i) + f_c(i)\} \text{ [dB]}$$

where, example $P_{CMAX,c}(i)$, $M_{PUSCHc}(i)$, $P_{O\_PUSCHc}(j)$, $\alpha_c(j)$, $PL_c$, $\Delta_{TF,c}(i)$ and $f_c(i)$ may be defined as follows. $P_{CMAX,c}(i)$ may be the configured UE transmit power in subframe i for serving cell c and $\hat{P}_{CMAX,c}(i)$ may be the linear value of $P_{CMAX,c}(i)$. $M_{PUSCHc}(i)$ may be the bandwidth of the PUSCH resource assignment expressed in number of resource blocks valid for subframe i and serving cell c. Po_PUSCH, c(j) may be configured employing RRC configuration parameters. If the UE is configured with higher layer parameter UplinkPowerControlDedicated-v12x0 for serving cell c and if subframe i belongs to uplink power control subframe set 2 as indicated by the higher layer parameter tpc-SubframeSet-r12. For j=0 or 1, $\alpha c(j) = \alpha_{c,2} \in \{0, 0.4, 0.5, 0.6, 0.7, 0.8, 0.9, 1\}$. $\alpha_{c,2}$ is the parameter alpha-SubframeSet2-r12 provided by higher layers for each serving cell c. For j=2, $\alpha_c(j)=1$ Otherwise: For j=0 or 1, $\alpha_c \in \{0, 0.4, 0.5, 0.6, 0.7, 0.8, 0.9, 1\}$ may be a 3-bit parameter provided by higher layers for serving cell c. For j=2, $\alpha_c(j)=1$; $PL_c$ may be the downlink path loss estimate calculated in the UE for serving cell c in dB and $PL_c$=referenceSignalPower–higher layer filtered RSRP, where referenceSignalPower is provided by higher layers and RSRP for the reference serving cell and the higher layer filter configuration for the reference serving cell; $\Delta_{TF,c}(i) = 10 \log_{10}((2^{BPRE \cdot K_s}-1) \cdot \beta_{offset}^{PUSCH})$ for $K_S=1.25$ and 0 for $K_S=0$ where $K_S$ is given by the parameter deltaMCS-Enabled provided by higher layers for each serving cell c, BPRE and $\beta_{offset}^{PUSCH}$, for each serving cell c, are computed as below. $K_S=0$ for transmission mode 2; f(i) may be a function of power control commands.

$PL_c$ is, for example, the downlink path loss estimate calculated in the UE for serving cell c in dB and $PL_c$=referenceSignalPower–higher layer filtered RSRP, where referenceSignalPower is provided by higher layers. The UE may measure on or more pathloss values employing signals received on one or more pathloss reference cells. A pathloss reference cell may be configured for a serving cell. The UE may calculate $PL_c$ and may employ one or more pathloss values ($PL_c$) for calculation of Type 1 and Type 2 power headroom fields. If serving cell c belongs to a TAG containing the primary cell then, for the uplink of the primary cell, the primary cell may be used as the reference serving cell for determining referenceSignalPower and higher layer filtered RSRP. For the uplink of the secondary cell, the serving cell configured by the higher layer parameter pathlossReferenceLinking may be used as the reference serving cell for determining referenceSignalPower and higher layer filtered RSRP. If serving cell c belongs to a TAG containing the PSCell then, for the uplink of the PSCell, the PSCell may be used as the reference serving cell for determining referenceSignalPower and higher layer filtered RSRP. For the uplink of the secondary cell other than PSCell, the serving cell configured by the higher layer parameter pathlossReferenceLinking may be used as the reference serving cell for determining referenceSignalPower and higher layer filtered RSRP.

If the UE transmits PUSCH with PUCCH in subframe i for serving cell c, power headroom for a Type 1 report may be computed using:

$$PH_{type1c}(i) = \tilde{P}_{CMAX,c}(i) - \{10 \log_{10}(M_{PUSCHc}(i)) + P_{O\_PUSCHc}(j) + \alpha_c(j) \cdot PL_c + \Delta_{TF,c}(i) + f_c(i)\} \text{ [dB]}$$

$\tilde{P}_{CMAX,c}(i)$ may be computed assuming a PUSCH only transmission in subframe i. For this case, the physical layer may deliver $\tilde{P}_{CMAX,c}(i)$ instead of $P_{CMAX,c}(i)$ to higher layers. If the UE does not transmit PUSCH in subframe i for serving cell c, power headroom for a Type 1 report may be computed using $$PH_{type1c}(i) = \tilde{P}_{CMAX,c}(i) - \{P_{O\_PUSCHc}(j) + \alpha_c(j) \cdot PL_c + \Delta_{TF,c}(i) + f_c(i)\} \text{ [dB]}$$

where, example $\tilde{P}_{CMAX,c}(i)$ may be computed assuming MPR=0 dB, A-MPR=0 dB, P-MPR=0 dB and □TC=0 dB.

Type 2: If the UE transmits PUSCH simultaneous with PUCCH in subframe i for the primary cell, power headroom for a Type 2 report is computed using:

$$PH_{type2}(i) = P_{CMAX,c}(i) - 10\log_{10}\left(10^{(10\log_{10}(M_{PUSCH,c}(i))+P_{O\_PUSCH,c}(j)+\alpha_c(j) \cdot PL_c+\Delta_{TF,c}(i)+f_c(i))/10} + 10^{(P_{O\_PUCCH}+PL_c+h(n_{CQI},n_{HARQ},n_{SR})+\Delta_{F\_PUCCH}(F)+\Delta_{TxD}(F')+g(i))/10}\right)$$

If the UE transmits PUSCH without PUCCH in subframe i for the primary cell, power headroom for a Type 2 report is computed using:

$$PH_{type2}(i) = P_{CMAX,c}(i) - 10\log_{10}\left(10^{(10\log_{10}(M_{PUSCH,c}(i))+P_{O\_PUSCH,c}(j)+\alpha_c(j) \cdot PL_c+\Delta_{TF,c}(i)+f_c(i))/10} + 10^{(P_{O\_PUCCH}+PL_c+g(i))/10}\right) \text{[dB]}$$

where, example $P_{CMAX,c}(i)$, $M_{PUSCHc}(i)$, $P_{O\_PUSCHc}(j)$, $\alpha_c(j)$, $\alpha_c(j)$, $\Delta_{TF,c}(i)$ and $f_c(i)$ may be of the primary cell parameters. If the UE transmits PUCCH without PUSCH in subframe i for the primary cell, power headroom for a Type 2 report is computed using:

$$PH_{type2}(i) = P_{CMAX,c}(i) -$$
$$10\log_{10}\left(\begin{array}{c}10^{(P_{O\_PUSCH,c}+\alpha_c(1)\cdot PL_c+f_c(i)+f_c(i))/10}\\+10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right)$$

where, example $P_{O\_PUSCHc}(1)$, $\alpha_c(1)$ and $f_c(i)$ are the primary cell parameters. If the UE does not transmit PUCCH or PUSCH in subframe i for the primary cell, power headroom for a Type 2 report is computed using:

$$PH_{type2}(i) = \tilde{P}_{CMAX,c}(i) - 10\log_{10}\left(\begin{array}{c}10^{(P_{O\_PUSCH,c}(1)+\alpha_c(1)\cdot PL_c+f_c(i))/10}\\+10^{(P_{0\_PUCCH}+PL_c+g(i))/10}\end{array}\right)[dB]$$

where, example $\tilde{P}_{CMAX,c}(i)$ may be computed assuming MPR=0 dB, A-MPR=0 dB, P-MPR=0 dB and TC=0 dB, $P_{O\_PUSCHc}(1)$, $\alpha_c(1)$ and $f_c(i)$ are the primary cell parameters. If the UE is unable to determine whether there is a PUCCH transmission corresponding to PDSCH transmission(s) or not, or which PUCCH resource is used, in subframe i for the primary cell, before generating power headroom for a Type 2 report, upon (E)PDCCH detection, with the following conditions: (1) if both PUCCH format 1b with channel selection and simultaneousPUCCH-PUSCH are configured for the UE, or (2) if PUCCH format 1b with channel selection is used for HARQ-ACK feedback for the UE configured with PUCCH format 3 and simultaneous-PUCCH-PUSCH are configured, then, UE may be allowed to compute power headroom for a Type 2 using:

$$PH_{type2}(i) = P_{CMAX,c}(i) -$$
$$10\log_{10}\left(\begin{array}{c}10^{(10\log_{10}(M_{PUSCH,c}(i))+P_{O\_PUSCH,c}(j)+\alpha_c(j)\cdot PL_c+\Delta_{TF,c}(i)+f_c(i))/10}\\+10^{(P_{0\_PUCCH}+PL_c+g(i))/10}\end{array}\right)[dB]$$

where example $P_{CMAX,c}(i)$, $M_{PUSCHc}(i)$, $P_{O\_PUSCHc}(j)$, $\alpha_c(j)$, $\Delta_{TF,c}(i)$ and $f_c(i)$ are the primary cell parameters.

The power headroom may be rounded to the closest value in the range [40; −23] dB with steps of 1 dB and is delivered by the physical layer to higher layers. If the UE is configured with higher layer parameter UplinkPowerControlDedicated-v12x0 for serving cell c and if subframe i belongs to uplink power control subframe set 2 as indicated by the higher layer parameter tpc-SubframeSet-r12, the UE may use $f_{c,2}(i)$ instead of $f_c(i)$ to compute $PH_{type1,c}(i)$ and $PH_{type2,c}(i)$ for subframe i and serving cell c.

In an example embodiment, for extendedPHR, the Extended Power Headroom Report (PHR) MAC control element may be identified by a MAC PDU subheader with LCD. It may have a variable size. When Type 2 PH is reported, the octet containing the Type 2 PH field may be included first after the octet indicating the presence of PH per SCell and followed by an octet containing the associated PCMAX,c field (if reported). Then follows in ascending order based on the ServCellIndex an octet with the Type 1 PH field and an octet with the associated PCMAX,c field (if reported), for the PCell and for each SCell indicated in the bitmap.

For extendedPHR2, the Extended Power Headroom Report (PHR) MAC control elements are identified by a MAC PDU subheader with LCD. They have variable sizes. One octet with C fields is used for indicating the presence of PH per SCell when the highest SCellIndex of SCell with configured uplink is less than 8, otherwise four octets are used. When Type 2 PH is reported for the PCell, the octet containing the Type 2 PH field is included first after the octet(s) indicating the presence of PH per SCell and followed by an octet containing the associated PCMAX,c field (if reported). Then follows the Type 2 PH field for the PUCCH SCell (if PUCCH on SCell is configured and Type 2 PH is reported for the PUCCH SCell), followed by an octet containing the associated PCMAX,c field (if reported). Then follows in ascending order based on the ServCellIndex an octet with the Type 1 PH field and an octet with the associated PCMAX,c field (if reported), for the PCell and for each SCell indicated in the bitmap.

In an example embodiment, the Extended PHR MAC control elements may be defined as follows. Ci: this field indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported. R: reserved bit, set to "0". V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated PCMAX,c field, and V=1 indicates that the octet containing the associated PCMAX,c field is omitted. Power Headroom (PH): this field indicates the power headroom level. The length of the field is 6 bits. The reported PH and the corresponding power headroom levels may be predefined. P: this field indicates whether the MAC entity applies power backoff due to power management (as allowed by P-MPRc). The MAC entity may set P=1 if the corresponding PCMAX,c field would have had a different value if no power backoff due to power management had been applied. PCMAX,c: if present, this field indicates the PCMAX,c or $\tilde{P}_{CMAX,c}$ used for calculation of the preceding PH field. The reported PCMAX,c and the corresponding nominal UE transmit power levels may be pre-defined.

In an example embodiment, the Dual Connectivity Power Headroom Report (PHR) MAC control element is identified by a MAC PDU subheader with LCID. It has a variable size. One octet with Ci fields may be used for indicating the presence of PH per SCell when the highest SCellIndex of SCell with configured uplink is less than 8, otherwise four octets are used. When Type 2 PH is reported for the PCell, the octet containing the Type 2 PH field is included first after the octet(s) indicating the presence of PH per cell (PSCell and all SCells of all MAC entities) and followed by an octet containing the associated PCMAX,c field (if reported). Then after that, when Type 2 PH is reported for the PSCell, the octet containing the Type 2 PH field is included followed by an octet containing the associated PCMAX,c field (if reported). Then follows in ascending order based on the ServCellIndex an octet with the Type 1 PH field and an octet with the associated PCMAX,c field (if reported), for the PCell and for all other serving cells of all MAC entities indicated in the bitmap.

In an example, the Dual Connectivity PHR MAC control element may be defined as follows. Ci: this field indicates the presence of a PH field for the serving cell of any MAC entity, except the PCell, with SCellIndex i. The Ci field set to "1" indicates that a PH field for the serving cell with SCellIndex i is reported. The Ci field set to "0" indicates that a PH field for the serving cell with SCellIndex i is not reported. R: reserved bit, set to "0". V: this field indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. Furthermore, for both Type 1 and Type 2 PH, V=0 indicates the presence of the octet containing the associated PCMAX,c field, and V=1 indicates that the octet containing the associated PCMAX,c field is omitted. Power Headroom (PH): this field indicates the power headroom level. The length of the field is 6 bits. The reported PH and the corresponding power headroom levels are shown in Table 1. P: this field indicates whether power backoff due to power management is applied (as allowed by P-MPRc). The MAC entity may set P=1 if the corresponding PCMAX,c field would have had a different value if no power backoff due to power management had been applied. PCMAX,c: if present, this field indicates the PCMAX,c or $\tilde{P}_{CMAX,c}$ used for calculation of the preceding PH field. The reported PCMAX,c and the corresponding nominal UE transmit power levels are may be predefined.

According to various embodiments, a device such as, for example, a wireless device, a base station, a network entity, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 14:
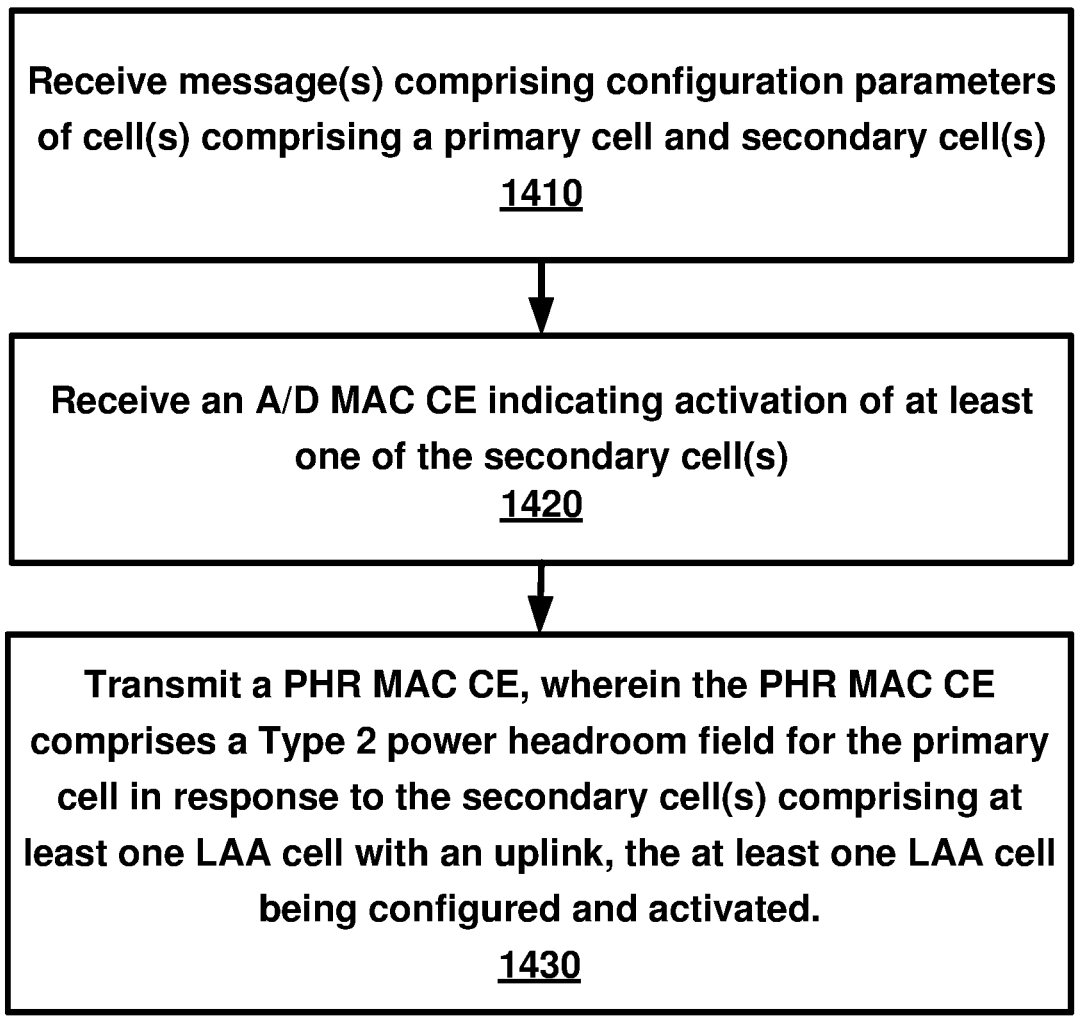
FIG. 14 is an example flow diagram for power headroom transmission as per an aspect of an embodiment of the present disclosure.

FIG. 14 is an example flow diagram as per an aspect of an embodiment of the present disclosure. At 1410, a wireless device may receive at least one message. The at least one message may comprise configuration parameters of a plurality of cells. The plurality of cells may comprise a primary cell and one or more secondary cells. An activation/deactivation (A/D) media access control control element (MAC CE) may be received at 1420. The A/D MAC CE may indicate activation of at least one of the one or more secondary cells. A power headroom (PHR) MAC CE may be transmitted at 1430. The PHR MAC CE may comprise a Type 2 power headroom field for the primary cell in response to the one or more secondary cells comprising at least one license assisted access (LAA) cell with an uplink. The at least one LAA cell may be configured and activated.

According to an embodiment, the PHR MAC CE may further comprise a Type 1 power headroom field for the primary cell. According to an embodiment, the PHR MAC CE may comprise the Type 2 power headroom field in response to a simultaneous physical uplink control channel (PUCCH) and a physical uplink shared channel (PUSCH) being configured. According to an embodiment, the PHR MAC CE may comprise the Type 2 power headroom field in response to the one or more secondary cells comprising at least one physical uplink control channel (PUCCH) secondary cell being configured and activated. According to an embodiment, the at least one message may comprise at least one parameter indicating that an extended PHR is configured. According to an embodiment, the at least one message may further comprise a first information element indicating whether a simultaneous PUCCH transmission and a physical uplink shared channel transmission is configured for the primary cell. According to an embodiment, the wireless device may further determine a Type 2 power headroom level for the Type 2 power headroom field employing: a determined power of a PUCCH, and a determined power of a PUSCH. Additionally, the wireless device may further determine a Type 1 power headroom level for the Type 1 power headroom field employing the calculated power of the PUSH. According to an embodiment, the wireless device may further obtain a measurement value by measuring a signal of a pathloss reference. A calculation of a Type 2 power headroom level for the Type 2 power headroom field may employ the measurement value. According to an embodiment, the PHR MAC CE may be employed by a base station for at least one of uplink packet scheduling or uplink power control.

According to an embodiment, the wireless device may further activate or deactivate at least one secondary cell in the one or more secondary cells according to the A/D MAC CE. According to an embodiment, a bit in the A/D MAC CE may indicate an activation/deactivation status of a corresponding secondary cell in response to the corresponding secondary cell being configured. According to an embodiment, a bit in the A/D MAC CE may indicate that a corresponding secondary cell is activated in response to the bit being set to one and the corresponding secondary cell being configured.

Figure 15:
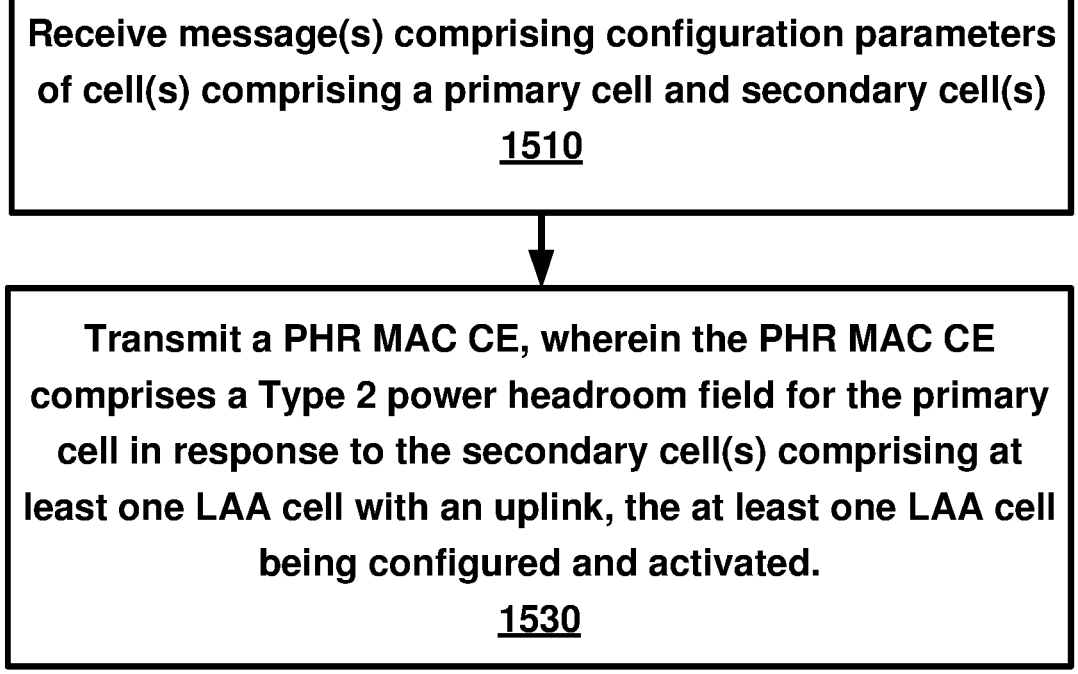
FIG. 15 is an example flow diagram for power headroom transmission as per an aspect of an embodiment of the present disclosure.

FIG. 15 is an example flow diagram as per an aspect of an embodiment of the present disclosure. At 1510, a wireless device may receive at least one message. The at least one message may comprise configuration parameters of a plurality of cells. The plurality of cells may comprise a primary cell and one or more secondary cells. A power headroom (PHR) MAC CE may be transmitted at 1530. The PHR MAC CE may comprise a Type 2 power headroom field for the primary cell in response to the one or more secondary cells comprising at least one license assisted access (LAA) cell with an uplink. The at least one LAA cell may be configured and activated.

According to an embodiment, the PHR MAC CE may further comprise a Type 1 power headroom field for the primary cell. According to an embodiment, the PHR MAC CE may comprise the Type 2 power headroom field in response to a simultaneous physical uplink control channel (PUCCH) and a physical uplink shared channel (PUSCH) being configured. According to an embodiment, the PHR MAC CE may comprise the Type 2 power headroom field in response to the one or more secondary cells comprising at least one physical uplink control channel (PUCCH) secondary cell being configured and activated. According to an embodiment, the at least one message may comprise at least one parameter indicating that an extended PHR is configured. According to an embodiment, the at least one message may further comprise a first information element indicating whether a simultaneous PUCCH transmission and a physical uplink shared channel transmission is configured for the primary cell. According to an embodiment, the wireless device may further determine a Type 2 power headroom level for the Type 2 power headroom field employing: a determined power of a PUCCH, and a determined power of a PUSCH. Additionally, the wireless device may further determine a Type 1 power headroom level for the Type 1 power headroom field employing the calculated power of the PUSH. According to an embodiment, the wireless device may further obtain a measurement value by measuring a signal of a pathloss reference. A calculation of a Type 2 power headroom level for the Type 2 power headroom field may employ the measurement value. According to an embodiment, the PHR MAC CE may be employed by a base station for at least one of uplink packet scheduling or uplink power control.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:
transmitting, by a base station to a wireless device, at least one radio resource control RRC) message comprising configuration parameters of a primary cell and at least one licensed assisted access cell with an uplink;
transmitting, to the wireless device, a medium access control control element (MAC CE) activation/deactivation (A/D) command indicating activation of the at least one licensed assisted access cell; and
receiving, from the wireless device, a power headroom report (PHR), wherein the PHR comprises a Type 2 power headroom of the primary cell in response to the at least one licensed assisted access cell with the uplink being configured and activated.

2. The method of claim 1, wherein the PHR further comprises a Type 1 power headroom field for the primary cell.

3. The method of claim 1, wherein the at least one RRC message further comprises at least one parameter indicating that an extended PHR is configured.

4. The method of claim 3, wherein the at least one RRC message further comprises a first information element indicating whether a simultaneous physical uplink control channel transmission and a physical uplink shared channel transmission are configured for the primary cell.

5. The method of claim 1, wherein a Type 2 power headroom level for the Type 2 power headroom is determined based on:
a power of a physical uplink control channel; and
a power of a physical uplink shared channel.

6. The method of claim 5, wherein a Type 1 power headroom level for a Type 1 power headroom is determined based on the power of the physical uplink shared channel.

7. The method of claim 1, wherein a Type 2 power headroom level for the Type 2 power headroom is determined based on a measurement of a pathloss reference.

8. The method of claim 1, wherein the PHR comprises the Type 2 power headroom in response to a simultaneous physical uplink control channel and a physical uplink shared channel being configured.

9. The method of claim 1, wherein the PHR comprises the Type 2 power headroom in response to a secondary cell comprising a physical uplink control channel secondary cell being configured and activated.

10. The method of claim 1, further comprising transmitting channel state information of the at least one licensed assisted access cell via an uplink channel of the primary cell.

11. A non-transitory computer-readable medium comprising instructions that, when executed by one or more processors of a base station, cause the base station to:
transmit, to a wireless device, at least one radio resource control (RRC) message comprising configuration parameters of a primary cell and at least one licensed assisted access cell with an uplink;
transmit, to the wireless device, a medium access control control element (MAC CE) activation/deactivation (A/D) command indicating activation of the at least one licensed assisted access cell; and
receive, from the wireless device, a power headroom report (PHR), wherein the PHR comprises a Type 2 power headroom of the primary cell in response to the at least one licensed assisted access cell with the uplink being configured and activated.

12. The non-transitory computer-readable medium of claim 11, wherein the PHR further comprises a Type 1 power headroom field for the primary cell.

13. The non-transitory computer-readable medium of claim 11, wherein the at least one RRC message further comprises at least one parameter indicating that an extended PHR is configured.

14. The non-transitory computer-readable medium of claim 13, wherein the at least one RRC message further comprises a first information element indicating whether a simultaneous physical uplink control channel transmission and a physical uplink shared channel transmission are configured for the primary cell.

15. The non-transitory computer-readable medium of claim 11, wherein a Type 2 power headroom level for the Type 2 power headroom is determined based on:
a power of a physical uplink control channel; and
a power of a physical uplink shared channel.

16. The non-transitory computer-readable medium of claim 15, wherein a Type 1 power headroom level for a Type 1 power headroom is determined based on the power of the physical uplink shared channel.

17. The non-transitory computer-readable medium of claim 11, wherein a Type 2 power headroom level for the Type 2 power headroom is determined based on a measurement of a pathloss reference.

18. The non-transitory computer-readable medium of claim 11, wherein the PHR comprises the Type 2 power headroom in response to a simultaneous physical uplink control channel and a physical uplink shared channel being configured.

19. The non-transitory computer-readable medium of claim 11, wherein the PHR comprises the Type 2 power headroom in response to a secondary cell comprising a physical uplink control channel secondary cell being configured and activated.

20. The non-transitory computer-readable medium of claim 11, wherein the instructions further cause the base station to transmit channel state information of the at least one licensed assisted access cell via an uplink channel of the primary cell.

* * * * *